United States Patent
Buckley

(10) Patent No.: US 7,519,458 B2
(45) Date of Patent: Apr. 14, 2009

(54) VEHICLE DIAGNOSTICS

(75) Inventor: Daniel Buckley, Model Farm (IE)

(73) Assignee: Snap-On Incorporated, Kenosha, WI (US)

( * ) Notice: Subject to any disclaimer, the term of this patent is extended or adjusted under 35 U.S.C. 154(b) by 452 days.

(21) Appl. No.: 11/177,043

(22) Filed: Jul. 8, 2005

(65) Prior Publication Data

US 2007/0010922 A1    Jan. 11, 2007

(51) Int. Cl.
*G01M 17/00* (2006.01)

(52) U.S. Cl. .................. 701/29; 701/2; 701/33

(58) Field of Classification Search .......... 701/29, 701/36, 33, 2
See application file for complete search history.

(56) References Cited

U.S. PATENT DOCUMENTS

| | | | |
|---|---|---|---|
| 6,028,537 A * | 2/2000 | Suman et al. | 340/988 |
| 6,370,455 B1 | 4/2002 | Larson et al. | |
| 6,556,904 B1 | 4/2003 | Larson et al. | |
| 2003/0097211 A1 | 5/2003 | Carroll et al. | |

* cited by examiner

*Primary Examiner*—Yonel Beaulieu
(74) *Attorney, Agent, or Firm*—McDonnell Boehnen Hulbert & Berghoff LLP

(57) ABSTRACT

A system, apparatus and method for analyzing a condition of a vehicle is provided. The system, apparatus and method are directed to obtaining vehicle information used for analyzing select vehicle data obtained from a vehicle, wherein after obtaining this information, the analysis may be carried out. The apparatus includes a computing platform having logic to obtain, via an interface that is communicatively coupled to the vehicle, select-vehicle data associated with an operation of the vehicle, ascertain that the computing platform lacks particular information for analyzing the select-vehicle data, communicatively couple to a remote node via a network to obtain the particular information for analyzing the select-vehicle data, obtain from the remote node via the network the particular information for analyzing the select-vehicle data, and analyze the condition of the vehicle using at least a portion of the particular information for analyzing the select-vehicle data.

20 Claims, 8 Drawing Sheets

VEHICLE DIAGNOSTICS

BACKGROUND

1. Technical Field

This following relates to vehicle-diagnostic systems. More particularly, the following relates to an apparatus, system and method for obtaining information for analyzing vehicle data.

2. Description of Related Art

About thirty five or so years ago, transportation vehicle manufacturers instituted on-board vehicle diagnostics ("OBD") systems to assist in diagnosing failures of control and monitoring systems of the vehicles manufactured by them. To do this, the OBD systems typically generate vehicle data that can be used to carry out the diagnostics of the command,-control and monitoring systems of the vehicle (hereinafter referred to as "vehicle systems"). The OBD systems are generally integrated into, integral to or otherwise combined with the vehicle systems that the OBD systems are intended to diagnose. The OBD systems, however, may be deployed separate from any of the vehicle systems.

While the earliest OBD systems did not conform to any standard protocol and varied greatly from one vehicle manufacturer to another, some (and later most) North American vehicle manufacturers in the mid-1980's adopted a standard protocol for OBD, namely OBD-I. For a myriad of reasons, including, for example, being able to provide additional monitoring and reporting services, many vehicle manufacturers adopted a second generation of the OBD protocol, namely OBD-II, for diagnosing failures of the vehicle systems.

Like its predecessors, the OBD-II protocol specifies various parameters of vehicle operation, such as vehicle emissions, that are to be available for diagnostics, and command-and-control purposes. The OBD-II protocol also provides standardized rules for monitoring and reporting malfunctions with vehicle operation. For example, when a malfunction is detected by an OBD system that complies with OBD-II, then the OBD system may alert the vehicle systems by providing vehicle data that includes an indication of the malfunction. The indication may then be used by the vehicle systems for reporting the malfunction. The reporting the malfunction may be carried out in a number of ways, including for example, illuminating a malfunction-indicator lamp (MIL), which is sometimes embodied as the well known "Check Engine" light.

In addition, the OBD-II protocol, like its predecessor, also provides that diagnostic-error codes and other vehicle data (hereinafter collectively referred to as "vehicle data") are to be stored for a period of time. This way, a vehicle-maintenance technician, other person and/or machine (collectively referred hereinafter to as "user") can access the vehicle data at a later time to assist in diagnosing the cause of the malfunction, even if the malfunction is no longer occurring.

To facilitate such diagnostics, monitoring, reporting and storage of vehicle data, the OBD system typically includes a device, commonly referred to as an "OBD" device, for obtaining, storing and/or analyzing the vehicle data. The OBD device, which may be embodied a combination of hardware, software, and/or firmware, and may be a stand-alone device (or number of devices). Alternatively, the OBD device may be integrated into, integral to or otherwise combined with the portions of the vehicle systems.

In either case, the OBD device may be adapted to (i) communicate with the vehicle systems to retrieve or otherwise obtain vehicle data generated by the OBD, and (ii) communicate the retrieved vehicle data to user of the OBD system. Using a diagnosis and command-and-control (DCC) device, which is capable of interfacing with the OBD device, a user may tap into the valuable resource of information provided by the OBD system.

For example, the OBD device may be adapted to monitor vehicle data generated by the OBD system for errors that occur during normal operation of the vehicle. And if such errors occur, then the OBD device may record and/or report the vehicle data to the user. The vehicle data can be later downloaded to or otherwise obtained by the DCC device when, for example, the vehicle is serviced or otherwise queried. After receipt, the vehicle data may then be presented to the user in an appropriate fashion via a user interface of the DCC device. The user interface may present the vehicle data in any number of ways, including for example, a format in accordance with the OBD-I and/or OBD-II protocols.

At present, there are many known DCC devices that are able to tap into the valuable resource of information provided by the OBD system. These DCC devices can vary from very simple to extremely sophisticated computing devices, some of which commonly called scan or diagnostic tools. Included among the more sophisticated DCC devices are the Modular Diagnostic Information System ("MODIS™") and the diagnostic scanner controller system MT2500™, both of which are manufactured and licensed for use by the present assignee. Details of exemplary DDC devices may be found in (i) U.S. Pat. Nos. 6,892,216; 6,845,307; 6,714,846; 6,693,367; 6,615,120; 6,564,128; 6,560,516; 6,512,968; 6,477,478; 6,141,608; and 6,029,508; and (ii) U.S. Patent Application Publication Nos. US20050096805; US20050075768A1; US20050085963; US20050027403A1; US20040172177A1; US20040003050A1; and US20030020759A1; all of which are assigned to the present assignee (or subsidiary thereof) of the present and incorporated herein by reference.

In addition to its processing abilities, each of many DCC devices employs logic and content, such as parametric and/or characteristic data, for analyzing the vehicle data received from the OBD system. This way, when a user attempts to analyze a condition of the vehicle, the DCC device may (i) obtain vehicle data, such as a diagnostic-error code, from the OBD system, and then (ii) process the diagnostic-error code as a function of the content so as to provide to the user an analysis of the condition of the vehicle. Accordingly, each of the DCC devices can dramatically reduce the time for servicing and/or making of reparations to the vehicle, thereby, reducing the labor-repair costs and increasing vehicle owner satisfaction and convenience.

Since the introduction of OBD systems, vehicles and their corresponding onboard-vehicle systems have increasingly become, and if history serves as an indicator the future, will continue to become substantially more complex; adding more components and functions carried out thereby. This growing complexity of the vehicles and their corresponding vehicle systems increasingly compounds a likelihood of malfunction of such vehicles and vehicle systems. This is because the probability of failure of the components, functions and interactions therebetween necessarily increases as a function of the increase in the number of such components, functions and interactions. Accordingly, DCC devices are presently and will continue to be indispensable in the practice of vehicle maintenance and repairs.

Nonetheless, economic infeasibility and computing platform restrictions generally prevents every one (if not any one) of the aforementioned DCC devices from containing all of the logic and/or content (collectively referred to hereinafter as "information") for analyzing the vehicle data for every vehicle that uses an OBD system. This is because the information for analyzing vehicle data is often sold by vehicle make, make and/or model year, and purchasing all the information for all (or even a significant subset of) possible vehicle makes and models is generally cost prohibitive.

In addition, even if a DCC device possesses all available information for analyzing vehicle data for a given vehicle or set of vehicles at a given point in time, the DCC device may not possess information for analyzing the vehicle data that was released after that point in time. This not so infrequent situation can happen when, for example, the OBD device or its firmware version was not available or was updated after the given point in time. The same situation may occur when as noted, the information possessed by the DCC device does not include information for analyzing the vehicle data of a particular (e.g., a new) model year of the given vehicle or set of vehicles.

Moreover, some of the DCC devices do not possess the ability to store on board in non-volatile form any of the information for analyzing the vehicle data. Thus, such information has to be loaded into each of these diagnostic tools each time the tool is to be used. To load the information, many of these diagnostic tools use a removably-insertable cartridge or other memory module that is programmatically configured with the information. And for the same reasons as above, the cartridge or other memory module may not be programmatically configured with the information for analyzing the vehicle data of the given vehicle or set of vehicles.

As can be readily discerned from the foregoing, when the DCC device lacks information for analyzing vehicle data for a particular condition, the tool becomes useless for carrying out any part of the analysis and/or repair of a vehicle until the tool obtains the lacking information. Obtaining the lacking information, however, has been a time-consuming and arduous undertaking. For example, obtaining the lacking information may take days or even weeks given that the time between placing an order for and delivery of the lacking information may be days or even weeks. Moreover, many times a trained, programming specialist is required to install the lacking information, and such trained, programming specialist may not be readily available.

The task of obtaining the lacking information for the DCC device becomes more problematic when considering that manufacturers of DCC devices have an economical interest in ensuring a profit on providing the information for analyzing vehicle data. To ensure profitability, many of the DCC devices are designed and programmed according to one or more proprietary formats, which thereby limits the sources from which the lacking information may be purchased and/or obtained. In addition, as noted above, the information for analyzing vehicle data is often sold by vehicle make, model and/or model year, and is generally available as an all or nothing proposition, and not on a piecemeal basis.

Thus, when a DCC device obtains specific set, particular part or otherwise select vehicle data associated with an operation of the vehicle (collectively referred to hereinafter as "select vehicle data"), and then ascertains that it lacks information for analyzing the select vehicle data, not only does the DCC device become useless for analyzing and repairing the vehicle, but also, the owner of the DCC device is saddled with potentially paying for more information than needed to analyze the select vehicle data.

Therefore, what is needed is an apparatus and/or system that includes a computing platform that is operable to obtain, in a timely fashion, at least the information for analyzing the select vehicle data, whereby after obtaining this information, the computing platform is not rendered useless for carrying out an analysis and/or repair of a vehicle. Such an apparatus and/or system may be advantageously configured to obtain the information for analyzing the select vehicle data without the need for purchasing all (or even a significant subset) of the information for all vehicles, and without aforementioned problems related to obtaining such information. However, such an apparatus and/or system may benefit equally as well when configured to obtain the information for analyzing the select vehicle data that is sold by vehicle make, model, model year, or some combination thereof.

Additionally, there is a need for a method directed to obtaining, in a timely fashion, at least the information for analyzing the select vehicle data, whereby after obtaining this information, an analysis and/or repair of a vehicle ay be carried out. This method may advantageously obtain the information for analyzing the select vehicle data without the need for purchasing all (or even a significant subset) of the information for all vehicles, and without aforementioned problems related to obtaining such information. Such method may also advantageously obtain the information for analyzing the select vehicle data that is sold by vehicle make, model, model year, or some combination thereof.

SUMMARY

In accordance with embodiments described below, provided is an apparatus, system and method directed to obtaining, in a timely fashion, at least the information for analyzing the select vehicle data, such that after obtaining this information, an analysis and/or repair of a vehicle may be carried out.

In one aspect, an apparatus for analyzing a condition of a vehicle is provided. The apparatus, which may employ a DCC device, such as a scan tool, includes a computing platform having logic to (i) obtain, via an interface that is communicatively coupled to the vehicle, select-vehicle data associated with an operation of the vehicle, (ii) ascertain that the computing platform lacks particular information for analyzing the select-vehicle data, (iii) communicatively couple to a remote node via a network to obtain the particular information for analyzing the select-vehicle data, (iv) obtain from the remote node via the network the particular information for analyzing the select-vehicle data, and (v) analyze the condition of the vehicle using at least a portion of the particular information for analyzing the select-vehicle data.

BRIEF DESCRIPTION OF THE DRAWINGS

Embodiments provided herein are described with reference to the following drawings, wherein like reference numerals refer to like elements in the various figures, and wherein.

DETAILED DESCRIPTION

Overview

Figure 1:
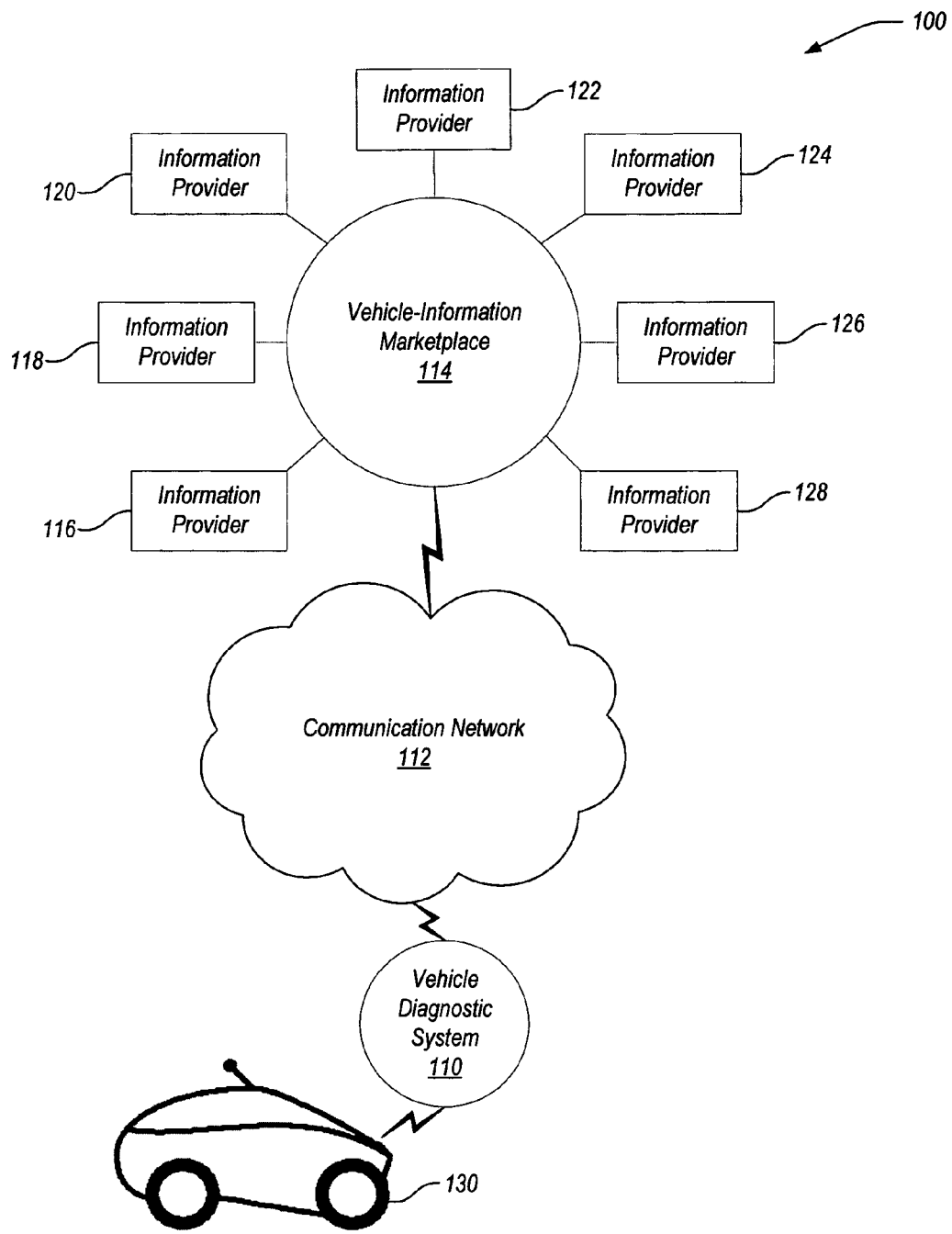
FIG. 1 is a first block diagram illustrating a first system in accordance with an exemplary embodiment.

FIG. 1 is a block diagram illustrating a system 100 in accordance with an exemplary embodiment. The system 100 includes a vehicle diagnostic system (VDS) 110 communicatively coupled via a communication network 112 to a vehicle-information marketplace (VIM) 114. Deployment of the system 100 may offer to vehicle repair facilities a substantial cost savings, improved workflow, and higher customer and employee satisfaction as compared to legacy processes and systems.

Through the deployment of the VDS 110, VIM 114 and communication network 112, the system 100 may beneficially provide a highly adaptable and extensible system that not only delivers enhanced diagnostics over traditional diagnostics, but also enhanced value through the integration of the VDS 110 with the VIM 114. Such integration allows the VDS 110 to obtain, on demand, from one or more vehicle-information providers 116-128 of the VIM 114 information that relates to an operation; an analysis, including monitoring and/or diagnosing; and/or a repair of a vehicle 130 (hereinafter referred to as "vehicle information"). This vehicle information may include, for example, (i) content, such as parametric and/or characteristic data associated with one or more conditions of the vehicle 130, and/or (ii) at least one vehicle application, which, in turn, includes logic that employs directives or other commands that utilize such content to aid in carrying out a servicing event of the vehicle 130.

In one embodiment, the integration may allow for the virtual or seemingly transparent merging of the application for carrying out diagnosis of the vehicle 130 with one or more sources of the vehicle information. Having the vehicle information available on demand, the VDS 110 can beneficially obtain, as needed, vehicle information associated with analyzing the select vehicle data that is obtained from the vehicle 130. And by obtaining such vehicle information, the VDS 110 can carry out a servicing event, e.g., vehicle diagnostics, of such vehicle despite not being previously configured to do so.

For example, the VDS 110 may employ a diagnostic-type vehicle application for carrying out a diagnosis of the vehicle 130. The diagnostic-type vehicle application, in general, may contain a number of functional modules for processing vehicle data that can be passed between vehicle 130 and the VDS 110. The functional modules process the vehicle data as a function of the vehicle information, which as noted may include logic, such as directives or other commands, and content, such as parametric and/or characteristic data.

Thus, when the VDS 110 obtains the select vehicle data associated with an operation of the vehicle, and ascertains that it lacks particular vehicle information for analyzing the select vehicle data, the VDS 110 is operable to obtain the particular vehicle information it lacks. To do this, for example, the VDS 110 may communicatively couple to the VIM 114 via the communication network 112. After coupling to the VIM 114, the VDS 110 obtains from one or more of the vehicle-information providers 116-128 the particular vehicle information for analyzing the select vehicle data. And after obtaining the particular vehicle information, the VDS 110 may then analyze the condition of the vehicle using at least a portion of the particular vehicle information obtained from the vehicle-information providers 116-128.

Architecture

Figure 2:
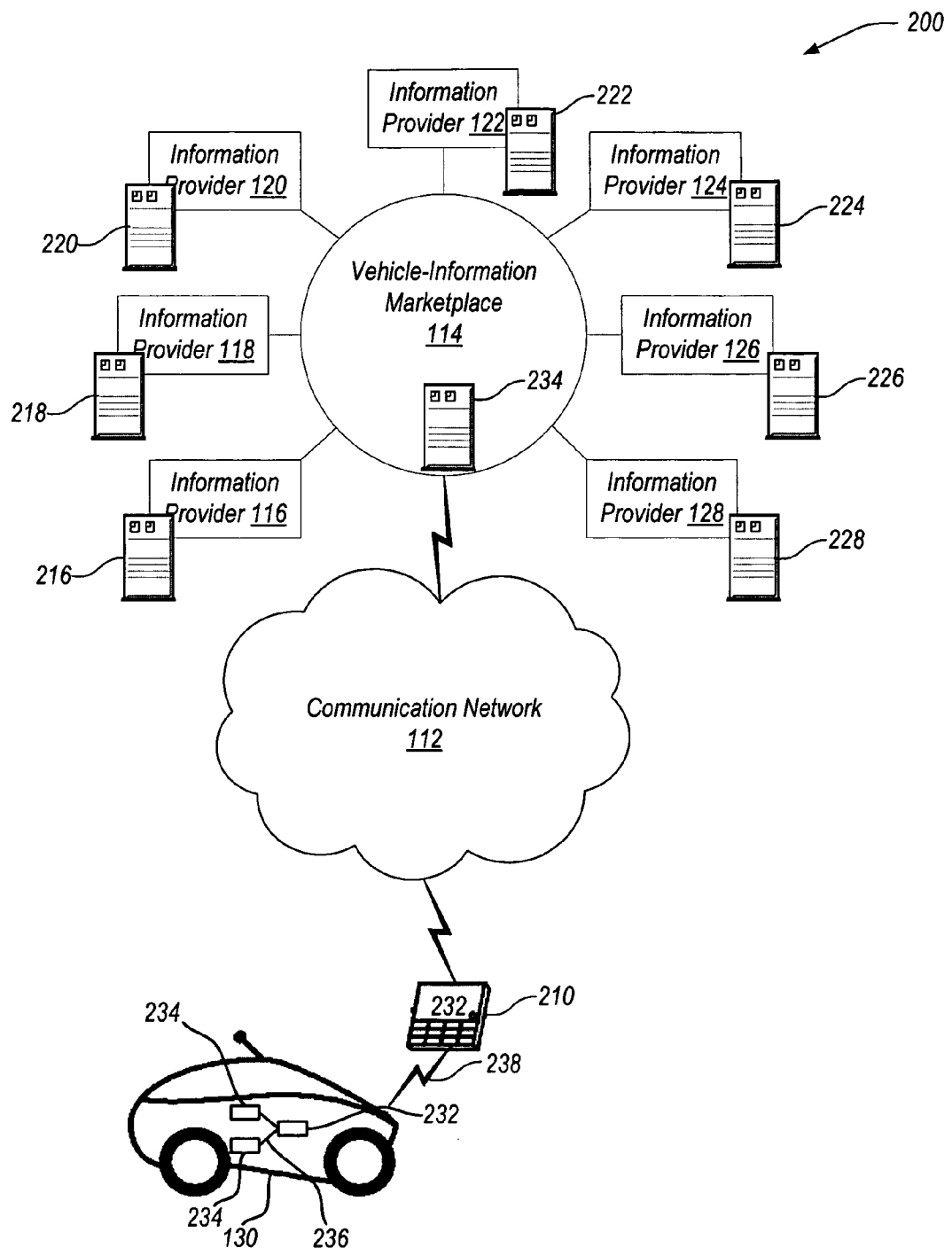
FIG. 2 is a second block diagram illustrating a second system in accordance with an exemplary embodiment.

FIG. 2 is a block diagram illustrating a system 200 in accordance with an exemplary embodiment. The system 200 includes a vehicle diagnostic system (VDS), which is embodied as a DCC device 210. As shown, the DCC device 210 is communicatively coupled to an OBD device 232 and one or more vehicle systems 234(a)-234(b) of the vehicle 130 via one or more internal-communication links 236(a)-236(c) and a vehicle-communication link or network ("vehicle-communication link") 238.

The OBD device 232 may act as a gateway for supplying to the DCC device 210 vehicle data generated by one or more of the vehicle systems 234(a)-234(b). The DCC device 210, however, may obtain the vehicle data generated by the vehicle systems 234(a)-234(c) from the vehicle-communication link and/or internal-communication links 238, 236(a)-236(c) without the use of the OBD device 232.

The DCC device 210 is also communicatively coupled to the VIM 114 via the communication network 112. As described in more detail below, the VIM 114 may be a single contact point for obtaining the vehicle information from each of the vehicle-information providers 116-128. Alternatively, the VIM 114 as shown may be representative of a number links in the communication network 112 or other network (not shown) to which the vehicle-information providers 116-128 are connected. In any case, each of the vehicle-information providers 116-128 includes a corresponding vehicle-information server, namely, vehicle-information servers 216-228, for providing the vehicle information to the DCC device 210.

The DCC device 210 may be embodied as computing platform that is distributed among a plurality of nodes or, alternatively, concentrated on a single node. All or portions of the DCC device 210 may be temporarily coupled or, alternatively, affixed to the vehicle 130.

Although not shown, the DCC device 210 may include or be coupled to a wired or wireless vehicle adapter for adapting it to the particular (e.g., manufacturer, make, and/or model of the) vehicle 130. The vehicle adapter may contain hardware and software for coupling the DCC device 210 to the internal-communication links 236(a)-236(c) to which the OBD device 232 and vehicle systems 234(a)-234(b) may be coupled.

This vehicle adapter may include, for example, an industry standard serial data module, or variant thereof, for vehicle buses based upon Society of Automotive Engineering standards, such SAE J1708, SAE J1939, ISO 9141, J1850, Keyword Protocol ("KWP") 2000, Controller Area Network ("CAN"), CAN-II, and/or other automotive, small-engine, marine and heavy-duty application standards. For existing applications, future high-speed-bus applications, and applications with other interfaces, an Automotive Serial Data Module (ASDM) or variant thereof may be used.

One benefit of the ASDM is that it provides additional filtering and compound operation capabilities that allow the DCC device 210 to process vehicle data destined for or retrieved from the internal-communication links 236(a)-236(c) without being overwhelmed by a high-speed data transfer. The vehicle adapter may be co-located with, integrated with, integral to or otherwise combined with the DCC device 210. Alternatively, the vehicle adapter may be separate from the DCC device 210.

Being a computing system or device, the DCC device 210 may include software operating on a processing system for carrying out the vehicle application and the functions thereof. The processing system may be, for example, a general purpose computing platform, a specialized computing platform, an open source (e.g., a Linux), computing platform, a proprietary computing platform, and the like.

The vehicle application may be maintained in memory of the DCC device 210, and thus, may be concentrated on a single node or distributed, in whole or in part, among one or more of the plurality of nodes. When needed, the DCC device 210 may obtain the vehicle application from the single node or the plurality of nodes.

As noted, the vehicle application may include logic, such as software and/or firmware code that employs directives or other commands that utilize the aforementioned content for processing the select vehicle data. The vehicle application may be assigned a version number to denote that it may include a specific set of the logic that uses one or more specific sets of the content. Similarly, the content may be assigned a version number to denote that it may include a specific set of the content. As described in more detail below, these version numbers may be used by the DCC device 210 and/or the VIM 114 to determine whether the vehicle application and/or content possess or, alternately, lack the particular vehicle information for analyzing the select vehicle data.

Also included in the vehicle application is logic that directs the DDC device 210 to interrogate the vehicle systems 234(*a*)-234(*c*) of vehicle 130 so as to obtain the vehicle data, which may include diagnostic, characteristic and/or status information. The diagnostic, characteristic and/or status information, in turn, may be provided as standardized or proprietary vehicle diagnostic, status and error codes.

To allow the vehicle application to carry out this interrogation and transfer vehicle data, the DCC device 210 and/or the vehicle application may include logic for effectuating (e.g., establishing, maintaining and tearing down) communications between the DCC device 210, the OBD device 232, and the vehicle systems 234(*a*)-234(*c*). Such communications and vehicle diagnostic information transfer may occur over the internal-communication links 236(*a*)-236(*c*) and the vehicle-communication link 238.

The internal-communication links 236(*a*)-236(*c*) may conform to any of a standard and/or proprietary, wired or wireless communication link format as described below in addition to any of a proprietary and/or standard vehicle communication protocol, such as the SAE J1708, SAE J1939, ISO 9141, J1850, Keyword Protocol ("KWP") 2000, Controller Area Network ("CAN"), CAN-II, and/or other automotive, small-engine, marine and heavy-duty application standards. Similarly, the vehicle communication link 238 may conform to any of a standard and/or proprietary, wired or wireless communication link, as set forth above and/or described in more detail below.

As noted above, the vehicle data may be used by the vehicle application to aid in analyzing a condition of the vehicle 130, including, for example, the diagnosis and resolution of a problem or other servicing event. The vehicle data along with resolution and vehicle diagnosis information may be supplied, via a user interface 232, to a user of the DCC device 210, such as a vehicle-maintenance technician, other person and/or machine (collectively referred to hereinafter as "user").

The user interface 232 may be optionally arranged with components, such as a data entry device (e.g., a keyboard or keypad), a display and graphical-user-interface (GUI) environment. Such components may be operable to enhance the vehicle applications by providing (i) simultaneous display of vehicle data and other information; (ii) user-friendly access to features of the DCC device 210; (iii) streamlined data entry; and/or (iv) a graphical display of parameters (e.g., history, meters, bar graphs, etc.).

The user interface 232 of the DCC device 210 may also be adapted to interact with the user, a barcode and/or other-type scanner to obtain vehicle details for logging the vehicle 130 in to the DCC device 210. These vehicle details may include, for example, a make, model, year and/or vehicle identification number of the vehicle 130. The DCC device 210, however, may be configured to obtain the vehicle details from the vehicle data so as to obviate a physical identification.

In one embodiment, the DCC device 210 may be deployed as a handheld device, such as a pocket personal computer; personal digital assistant; a mobile telephone; a scan-type diagnostic tool, such as a scan-type tool 700 described herein below and illustrated in FIG. 7; etc., which may be removably or wirelessly connected to the vehicle 130. Alternatively, the DCC device 210 may be embodied as a ruggedized handheld computer, such as a Symbol 1740, which runs a Palm operating system, or a Symbol 2840, which runs a Windows CE operating system.

Such ruggedized handheld computer or any other embodiment of the DCC device 210 may be equipped with one or more of communications interface adapters. These communications interface adapters may be adapted to, in accordance with an appropriate communication protocol, (i) communicate with the vehicle systems 234(*a*)-234(*b*) via the internal-communication links 236(*a*)-236(*c*) and vehicle-communication link 238, and (ii) communicate with one or more of the vehicle-information servers 216-228 via the communication network 112.

If the DCC device 210 is configured in distributed fashion across the plurality of nodes, then the nodes of DCC device may 210 include one or more interface adapters for communicating among such nodes. These interface adapters may be adapted to allow the nodes to communicate over internal system busses of the computing platform, an Ethernet connection, a universal serial bus, an IEEE 1894 connection, and/or any other local and networking protocol connection. Using the interface adapters, the node or nodes of the DCC device 210 that carry out the vehicle application ("vehicle-application processing nodes") may obtain the vehicle application from other nodes, as needed, rather than keeping resident all the vehicle applications.

By way of example, one of the vehicle-application processing nodes of the DCC device 210 may be a handheld module that can be configured to carry out one or more of the vehicle applications. Instead of maintaining all the vehicle applications in the handheld module, however, the handheld module may only maintain a subset of the vehicle applications to take advantage of low cost, low power and flexibility of handheld-type devices. In such case, the handheld module may obtain from other, e.g., storage and/or docking, nodes of the DCC device 210 one or more of the vehicle applications that are not locally maintained in the handheld module.

On the other hand, given the recent advances in computing-platform memory and processing power, the handheld module may maintain all the vehicle applications locally. In any case, new vehicle applications can be added to the vehicle-application processing nodes of DCC device 210 on an as needed basis.

In another embodiment, the DCC device 210 may be deployed as a client/server or peer-to-peer system. Recognizing that each device in client/server and peer-to-peer systems can be both a requester and a supplier, each of the client, server and/or peers are referred to herein simply as a system node. In either the client/server or peer-to-peer system, for example, a first system node may be positioned aboard the vehicle 130 to obtain vehicle data from the vehicle systems 234(a)-234(b). To do this, the first system node may be adapted to communicatively couple to the vehicle systems 234(a)-234(b) via the internal-communication links 236(a)-236(c).

The first system node may be further adapted to communicatively couple to a second system node via the vehicle-communication link 238. This way the vehicle data may be passed between the vehicle systems 234(a)-234(b) and the rest of the system nodes via the first and second system nodes.

In addition, any of the system nodes may be communicatively coupled, via the communication network 112, to one or more of the vehicle-information servers 216-228. Thus, any of the system nodes may be adapted to obtain vehicle information from the vehicle-information servers 216-228.

To facilitate the integration with the VIM 114, the DCC device 210 may also include logic for carrying out communications with one or more of the vehicle-information providers 116-128 to obtain the vehicle information. This logic may also be configured to exchange with one or more of the vehicle-information providers 116-128 vehicle data and/or service-validating information, which is used by vehicle-information providers 116-128 to determine whether to supply the vehicle information to the DCC device 210. The service-validating information, as described in more detail below, may include any information to substantiate that the DCC device 210 has covered or can cover any charge for the vehicle information. The exchange vehicle data and/or service-validating information may occur over the communication network 112, and thus, the DCC device 210 may include logic for facilitating communications over the communication network 112 as well.

Each of the communication network 112 and vehicle-communication link 238 may be a partial or full deployment of most any communication or computer network, and thus, can include a few or many network elements, most of which are not shown. The format of these communication networks may be public or private, terrestrial wireless or satellite, and/or wireline, and may take into account any communication protocols for facilitating communications between the devices.

Public wired and/or wireless networks typically provide telecommunications and other networking services in a particular geographic coverage area to its subscribers. And generally, any interested member of the public meeting minimal criteria may become a subscriber of public network. In the case of terrestrial wireless or satellite networks, public networks typically provide coverage to other wireless networks' subscribers who are roaming within the coverage area of network as well.

Additionally, the coverage area of public network is typically wide-ranging. For example, the coverage area of a wireless public network may encompass a metropolitan area, a substantial part of a metropolitan area, numerous metropolitan areas, or an entire nation or region. When integrated with public wired and satellite networks, the combined networks provide national along with international coverage. Thus, both of the vehicle-communication link 238 and the communication network 112 may include portions of a Public Switch Telephone Network (PSTN), the Internet, core and proprietary public networks, other wired voice and packet-data networks, and/or wireless voice and packet-data networks, such as, 1G-4G public networks, Bluetooth™ wireless networks, IEEE 802.11 et, seq. wireless local area networks (WLANs), UltraWideBand (UWB) wireless networks, ZigBee wireless personal area networks (WPANs), IEEE 802.15 WPANs, IEEE 802.16 broadband wireless access (BWA) networks (a.k.a. "WiMAX") telecommunication networks. Accordingly, both of the vehicle-communication link 238 and the communication network 112 may include circuit-switched as well as packet-data elements to provide transport between the vehicle systems 234(a)-234(b) and the DCC device 210, and (ii) the DDC device 210 and one or more of the vehicle-information servers 216-228, respectively.

Alternatively, both of the vehicle-communication link 238 and the communication network 112 may be a private or "enterprise" wired or wireless network. Unlike public networks, private networks advantageously provide the enterprise with greater control over the network, which in turn allows vast customization of the services (e.g., localized abbreviated dialing) provided to the network's users and/or subscribers.

These networks are "private" in that the networks' coverage areas are more geographically limited. Typically, but not necessarily, subscription to such private networks is limited to a select group of subscribers. Networks deployed by many enterprises that only allow their employees, customers, vendors, and suppliers to subscribe exemplify these private networks.

Many enterprises, service facilities, Small Office/Home Office (SOHO) entities, and private individuals have private-wireline-switching systems. These private-wireline-switching systems may include, for example, private branch exchanges (PBXs) and/or media gateways. The private-wireline-switching systems switch, couple or otherwise connect communications (i) internally, i.e., among the subscribers of the network and (ii) externally, i.e., between the subscribers of the private network and subscribers of public networks.

In addition to the wireline networks, enterprises, service facilities, SOHOs and private individuals are increasingly deploying private wireless communication systems, such as wireless office telephone systems ("WOTS"); Bluetooth™, IEEE 802.11, or other WLANs; IEEE 802.15, Zigbee, UWB or other WPANs; and/or IEEE 802.16 or other BWA networks, in lieu of or in addition to wireline switching systems. Similar to public networks, private networks may be integral to or integrated with other private and public satellite, terrestrial wireless, and wireline networks to provide national and international coverage. It is recognized, however, that differences between private and public networks may only be a matter of semantics due to convergence between communication technologies.

Accordingly, both of the vehicle-communication link 238 and the communication network 112 can be any of a private and/or public terrestrial, satellite and/or other wireless network. And both of the vehicle-communication link 238 and the communication network 112 can be incorporated into (i) a wide-area network (WAN), thereby creating a Wireless WAN (WWAN); (ii) a wired local area network (LAN), thereby creating a WLAN, WPAN, UWB network or BWA network; and/or (iii) other wired network. Alternatively, each of wireless communication networks can be a standalone WLAN, WLAN, WPAN, UWB network or BWA network.

At times, a single wireless service or technology may not provide a desirable messaging cost structure or geographical coverage to support all the features and users of the system 100. Multiple services might be used instead to provide for dynamic balancing between messaging costs and message timeliness. In addition, different wireless services and technologies may have different application program interfaces (APIs) and/or require custom interfaces for given computing environments. Moreover, messaging capabilities may differ across different services and technologies. To take advantage of such benefits, the DCC device 210 and the vehicle-information servers 216-228 may include multiple interface adapters for accessing the multiple formats of the vehicle-communication link 238 and the communication network 112.

In addition, both of the vehicle-communication link 238 and communication network 112 may include an access node, such as a wireless-access point (not shown) or other network adapter, to provide network access (e.g., ingress and egress) to the DCC device 210 and the vehicle-information servers 216-228. Each of the access nodes (or other network adapters) may therefore act as a gateway between the DDC device 210 and the vehicle-information servers 216-228.

Each of the vehicle-information servers 216-228 may employ software that operates upon a processing system, e.g., a general purpose computing platform, a specialized computing platform, an open source, e.g., a Linux, computing platform, a proprietary computing platform, and the like. This software may provide a host of applications including one or more applications for providing the vehicle information to the DCC device 210 in response to the DCC device 210 (i) requesting the vehicle information, and in some cases, (ii) providing the service-validating information.

By way of example, each of the vehicle-information servers 216-228 may be a WindowsXP-based server equipped with a SQL Server 2000 database management system (DBMS), and business logic, such as front-office and back-office applications, for servicing the DCC device 210. The front-office and back-office applications may include, for example, Customer Relationship Management (CRM), Sales Force Automation (SFA), Enterprise Resource Planning (ERP) and/or other customer service and support applications.

CRM allows the VIM 114 and/or each of the vehicle-information servers 216-228 to operate as an integrated information system for controlling presales and postsales activities. SFA provides such functions as contact management and product configurators. ERP provides such functions as order entry, accounts receivable and payable, general ledger, and contract management. The CRM, SFA and ERP provide a business platform that enables the VIM 114 and/or each of the vehicle-information servers 216-228 to interact with the DCC device 210 through the communication network 112.

Through this business platform, the VIM 114 and/or each of the vehicle-information servers 216-228 can ensure that any charge for the vehicle information is covered or paid for. The charge for the vehicle information may be a monetary fee, which can be covered by one or more fee arrangements. These fee arrangements may include a subscription-fee arrangement, one-time-fee arrangement, one-time-activation-fee arrangement, prepaid-fee arrangement, renewal-fee arrangement, etc. The fee arrangements may be based on usage. For example, the fee arrangement may be based upon (i) the particular information accessed, (ii) the number of times that the user accesses information, (iii) the quantity of information accessed by the user, (iv) etc. Many other fee arrangements are possible as well.

To ensure that any charge for the vehicle information is covered, the VIM 114 and/or each of the vehicle-information servers 216-228 may be configured to receive from the DCC device 210 the service-validating information to substantiate that the DCC device 210 has paid or is operable to pay for the vehicle information. Such service-validating information may include, for example, subscription information, credit information, prepaid-fee-arrangement information, debit information, checking account information, savings account information; and/or any other information to substantiate that the DCC device 210 has paid or is operable to pay for the vehicle information.

Although the VIM 114 and each of the vehicle-information servers 216-228 are shown as a single computing platform, the VIM 114 and each of the vehicle-information servers 216-228 may include a series of servers that provide applications for serving the vehicle information to the DCC device 210. These servers may carry out web page hosting, business logic applications, data storage, communications network management, etc.

As noted above the VIM 114 may be a single contact point for obtaining the vehicle information from each of the vehicle-information providers 116-128. To do this, the VIM 114 may deploy a server 240 that is communicatively coupled to one or more of the vehicle-information servers 216-228. One such single contact point may be available from the Mitchell Repair Information Company, LLC online at ondemand5.com.

In an alternative embodiment, the VIM 114 may be a representation of a number links in the communication network 112 or other network (not shown) to which the vehicle-information servers 216-228 are coupled. In this embodiment, the DCC device 210 may separately couple to one or more of the vehicle-information servers 216-228 to obtain the vehicle information. Such coupling may be carried out using a point-to-point conduit when coupling to one of the vehicle-information servers 216-228 or a point-to-multipoint conduit when coupling to more than one of the vehicle-information servers 216-228

The above-described architecture of the system 100 is for exemplary purposes only. Other embodiments and/or more or less components of the system 100 may be used as well.

Operation

Figure 3:
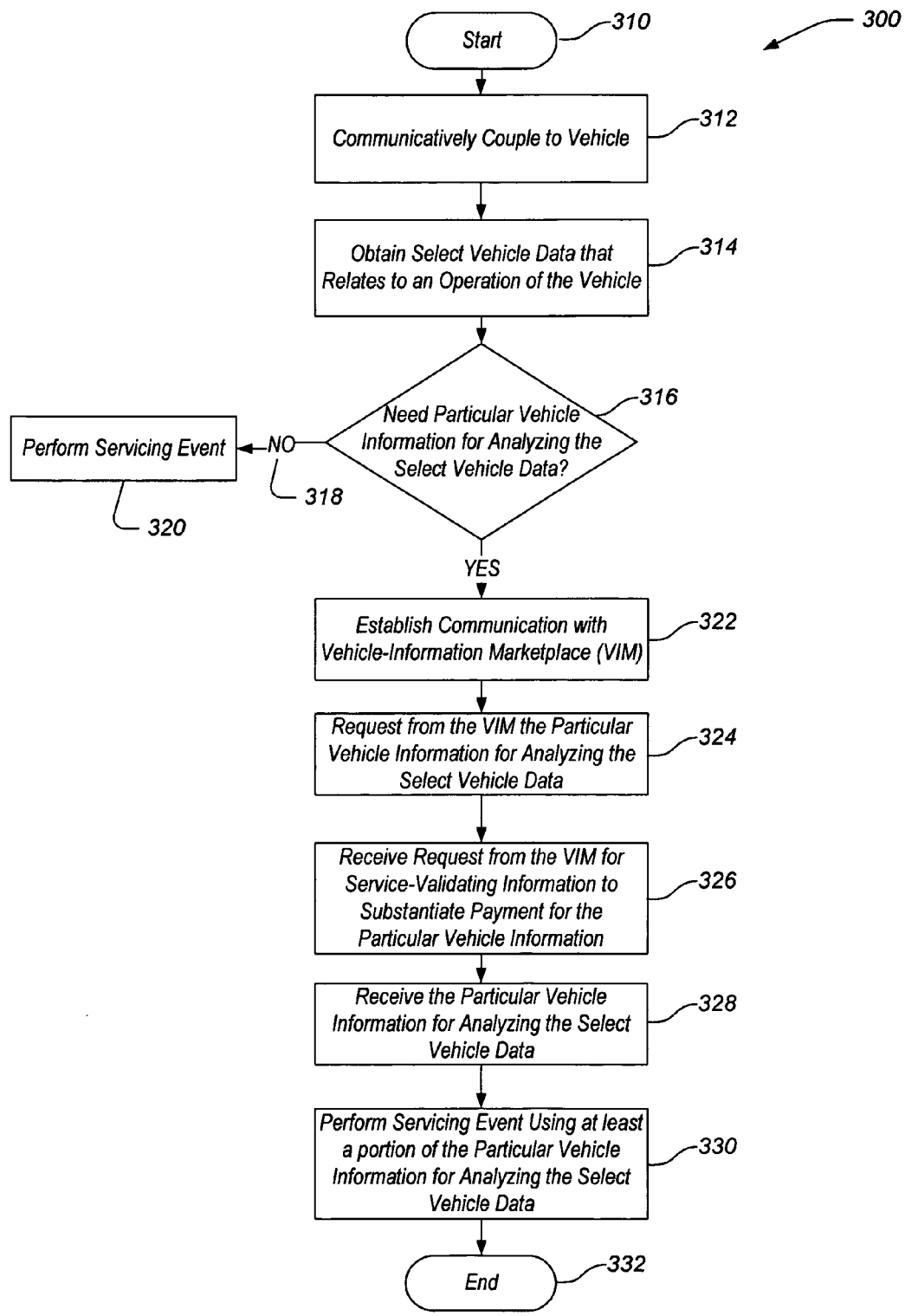
FIG. 3 is a first flow diagram illustrating a first flow for carrying out a servicing event of a vehicle in accordance with an embodiment.

FIG. 3 is a flow diagram illustrating a flow 300 for carrying out a servicing event of a vehicle in accordance with an embodiment. Although the flow 300 may be carried out by different architectures, the following is described with reference to the system 200 for simplicity.

In this embodiment, the DCC device 210 may be embodied as any of the handheld device embodiments noted above. The VIM 114 may be configured as the single contact point for obtaining the vehicle information. The vehicle-communication link 238 may be embodied as a wired communication link in accordance an SAE or Heavy Duty Vehicle Standard. The communication network 112 may be embodied as a WLAN integrated with a public network, such as the Internet. The user of the DCC device 210 may be a service technician.

The flow 300 starts at block 310. Before the start of the flow 300, however, the service technician boots the DCC device 210, which may be accomplished by applying power to the DCC device 210. Responsive to the initiation of the boot, the DCC device 210 prepares for operation by performing any initialization sequences and loading into memory the operating system and/or at least one vehicle application.

After the DCC device 210 becomes operational, the service technician logs the vehicle 130 into the DCC device 210. To do this, the service technician may enter into the DCC device 210 via the user interface the vehicle details of the vehicle 130 to be serviced.

Alternatively, the DCC device 210 may automatically detect the vehicle details. Such automatic detection may be carried out by the service technician scanning a barcode or other vehicle identification tag using the scanning device coupled to or integrated into the DCC device 210. The DCC device 210 may also automatically detect the vehicle 130 by uploading the vehicle details from a service facility electronic-vehicle-tracking system. Details of such an electronic-vehicle-tracking system may be found in co-pending U.S. patent application Ser. No. 10/853,700, the entirety of which is incorporated herein by reference.

As another alternative, the DCC device 210 may obtain the vehicle details, such as the vehicle identification number, without logging the vehicle 130 into the DCC device 210. For example, the DCC device 210 may obtain the vehicle details as a result of coupling the vehicle adapter to the vehicle 130. Such acquisition may occur because the vehicle adapter may be correlated to the vehicle details, as noted above. Alternatively, the DCC device 210 may automatically obtain the vehicle details from vehicle data retrieved from the vehicle 130 via the vehicle-communication link 238 (after effectuating such a communication with the vehicle 130).

In addition entering the vehicle details, the service technician may also have to confirm his or her authorization to use the DCC device 210 by supplying authentication and security credentials (e.g., user name and password) to gain access to and log the vehicle 130 into the DCC device 210. The service technician may also supply the service-validating information, which can be used at a later time to substantiate that the DCC device 210 has paid for or is operable to pay for the particular vehicle information that it lacks. Alternatively the service-validating information may be obtained automatically from a data store of the DCC device 210.

Referring now to block 312, the service technician causes the DCC device 210 to be communicatively coupled to the vehicle 130 to obtain the vehicle data. To do this, the vehicle adapter of the DCC device 210 may be coupled to a port attached to the internal-communication links 236(a)-236(c). After being coupled, the service technician may then initiate a communication application on the DCC device 210 to establish a communication between the DCC device 210, the internal-communication links 236(a)-236(c) and the vehicle-communication link 238 in accordance with the SAE or Heavy Duty Vehicle Standard. Once coupled, the DCC device, the OBD device 232 and the vehicle systems 234(a)-234(b) may communicate.

Thereafter, the service technician may initiate via the user interface 232 of the DCC device 210 the vehicle application for interrogating the OBD device 232 and vehicle systems 234(a)-234(b) to attempt to obtain and analyze vehicle data. Upon execution of the vehicle application the DCC device 210 may obtain from the vehicle 130 the select vehicle data relating to an operation of the vehicle, as shown in block 314.

Thereafter, the vehicle application may perform a check to ascertain whether the DCC device 210 possess or, conversely, lacks particular vehicle information for analyzing the select vehicle data, as shown in decision block 316. To do this, the vehicle application may scan the data store and memory of the DCC device 210 to determine if the data store or memory lacks the particular vehicle information, including, for example, the directives, other commands, parametric data and/or characteristic data that are associated with the select vehicle data. Alternatively, the service technician may examine the data store and memory of the DCC device 210 via the user interface 232 to determine if the DCC device 210 lacks the particular vehicle information.

If the DCC device 210 or the service technician ascertains that the DCC device 210 possesses the particular vehicle information, then the DCC device 210 may perform the servicing event in accordance with such information, as shown by path 318 to block 320. However, if the DCC device 210 or the service technician ascertains that the DCC device 210 lacks the particular vehicle information, then the DCC device 210 steps to block 322. In addition, if the service technician ascertains that the DCC device 210 lacks the particular vehicle information, then before stepping to block 322, the service technician may set an indication on the DCC device 210 that indicates that the DCC device 210 lacks the particular vehicle information.

At block 322, the DCC device 210 establishes a communication with the VIM 114. To do this, the DCC device 210 via one or more of its communication adapters may establish a point-to-point conduit with the VIM 114. The point-to-point conduit may be effectuated by the DCC device 210 first registering with the communication network 112, and then coupling to the VIM 114 via the communication network 112 (assuming the VIM 114 is already associated with the communication network 112).

Registering with the communication network 112, in the simplest form, may include merely "associating" the DCC device 210 with the communication network 112 via the wireless access point. Registering may also include "logging" into the communication network 112, which may include providing a username and password, such as the username and password entered into the DCC device 210, as noted above. Registering with the communication network 112 may also include employing secure connection services, such as IEEE 802.11 Wired Equivalency Privacy (WEP), security system identification (SSID), extensible authentication protocol (EAP), Internet Protocol Security (IPSEC) or other secure connection service. Details of registering the DCC device 210 in a Bluetooth™, IEEE 802.11, or other WLAN; and IEEE 802.15, Zigbee, UWB or other WPAN; and/or IEEE 802.16 or other BWA network are generally described in a protocol associated with the format of such networks. For instance, the details for registering in an IEEE 802.11 WLAN, IEEE IEEE 802.15 WPAN, IEEE 802.16 BWA network or Bluetooth WLAN are described in more detail in the respective IEEE 802.11 protocol, IEEE 802.15 protocol, IEEE 802.16 protocol and Bluetooth standard, each of which is incorporated herein by reference in its entirety.

After registering, the DCC device 210 may establish, using generally known techniques, the point-to-point conduit with the server 240. After the point-to-point conduit is established, the DCC device 210 may then send to the server 240 a first request for the particular vehicle information, as shown in block 326.

This first request may be formatted in accordance with most any communication signaling and/or messaging protocol. For example, the first request may be formatted according to one or more protocols for communicating via the Internet, such as HTML, XML, VRML, FTP, SMTP, SIP, etc.

Responsive to the first request, the server 240 may query itself and/or one or more of the vehicle-information servers 216-228 to obtain the particular vehicle information. Prior to sending the particular vehicle information to the DCC device 210, however, the DCC device 210 may receive from the server 240 a second request for the service-validating information to substantiate that the DCC device 210 has paid for the vehicle information, as shown in block 326.

Like above, this second request may be formatted in accordance with most any communication signaling and/or messaging protocol. For simplicity, however, this second request may be in the same format as the request from the DCC device 210. If, however, the DCC device 210 cannot substantiate that it has paid for the vehicle information, the server 240 (or a proxy thereof) is operable to obtain payment from the DCC device 210 by employing a fee arrangement, such as the fee arrangements noted above.

After ensuring that the DCC device 210 has paid for the particular vehicle information, the server 240 may then send such information to the DCC device 210 via the point-to-point protocol conduit, as shown in block 328. The DCC device 210, after obtaining the particular vehicle information from the server 240, may carry out the servicing event using at least a portion of the particular vehicle information obtained from server 240, as shown in block 330.

To do this, the DCC device 210 may, as appropriate, incorporate into (e.g., by replacement and/or modification of) its current logic and/or content any of the logic and/or content obtained from the server 240. The DCC device 210 may communicatively re-couple, if decoupled, to the port on the internal-communication links 236(*a*)-236(*c*) and the vehicle-communication link 238. Thereafter, the DCC device 210 may interrogate the OBD device 232 and vehicle systems 234(*a*)-234(*b*) to obtain the select vehicle data. The DCC device 210 may then analyze one or more conditions of the vehicle 130 as a function of the select vehicle data and at least a portion of the particular vehicle information obtained from the server 240. In turn, the DCC device 210 may send a result of the analysis to the user interface 232 for display. At block 332, the flow 300 ends.

Figure 4:
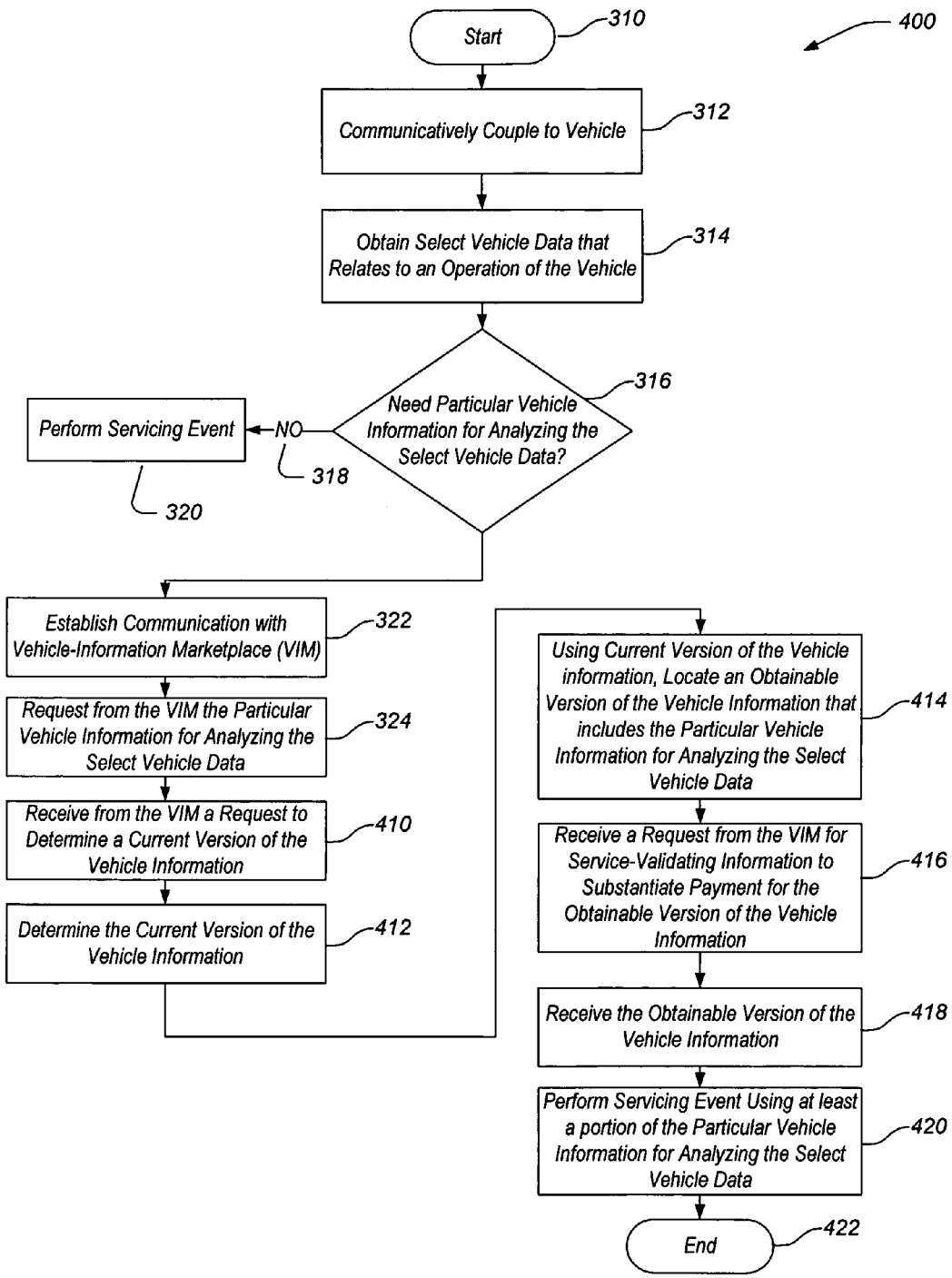
FIG. 4 is a second flow diagram illustrating a second flow for carrying out a servicing event of a vehicle in accordance with an embodiment.

Referring now to FIG. 4, a flow diagram illustrating a flow 400 for carrying out a servicing event of a vehicle in accordance with an embodiment is shown. Although the flow 400 may be carried out by different architectures, the following is described with reference to the system 200 for simplicity. The flow 400 is similar to the flow 300 in most aspects. Accordingly, many details described with respect to flow 300 are not repeated below.

Referring now to block 410, the DCC device 210 receives from the server 240 a third request to interrogate the DCC device 210 to determine a version of the vehicle information possessed by the DCC device 210 (hereinafter referred to as a "current version of the vehicle information"). The third request may include, for example, a request to interrogate the DCC device 210 for a current version number of the vehicle application and/or content. The third request may be formatted in accordance with most any communication signaling and/or messaging protocol. For simplicity, however, this third request may be in the same format as the first request from the DCC device 210 (block 324).

Responsive to an affirmative reply to the third request, the server 240 may interrogate the DCC device 210 to determine the current version of the vehicle information, as shown in block 412. In one embodiment, the server 240 may send to the vehicle application that is residing in memory a message to (i) request the current version number of such vehicle application along with (ii) request the current version number of the content. Responsive to this message, the vehicle application may send to the server 240 a reply message indicating its current version number along with the current version number of the content.

Alternatively, the server 240 may send to the DCC device 210 a message to (i) request the current version number of such vehicle application along with (ii) request the current version number of the content. Responsive to this message, the DCC device 210 may scan the data store and/or memory of the DCC device 210 to obtain the current version numbers for the vehicle application and the content. After obtaining the current versions numbers of the vehicle application and/or content, the DCC device may send to the server 240 a reply message that includes the current version numbers of the vehicle application and/or content.

As another alternative, the server 240 may (i) download to the DCC device 210 (usually after approval from the DCC device 210) a query application to scan the data store and/or memory of the DCC device 210 to obtain the current version numbers for the vehicle application and/or content, and (ii) cause the DCC device 210 to execute the downloaded query application. After scanning the data store and/or memory of the DCC device 210, the query application may then send to the server 240 the current version numbers for the vehicle application and/or content. The query application then completes, unloads from the memory of the DCC device, and is typically deleted from the DCC device 210. The query program, however, may be stored in the data store of the DCC device 210 for later retrieval and use.

The server 240, using the current version numbers of the vehicle application and/or content obtained from the DCC device 210, may query itself and/or one or more of the vehicle-information servers 216-228 to locate obtainable versions of the vehicle application and/or content that include the particular vehicle information, as shown in block 414. After locating the obtainable versions of the vehicle application and/or content, the server 240 may acquire for distribution to the DCC device 210 the obtainable versions of the vehicle application and/or content.

Prior to sending the obtainable versions of the vehicle application and/or content to the DCC device 210, the server 240 may send a request to the DCC device 210 for the service-validating information to substantiate that the DCC device 210 has paid for obtainable versions of the vehicle application and/or content, as shown in block 416. Like above, this request may be formatted in accordance with most any communication signaling and/or messaging protocol. For simplicity, however, this request may be in the same format as the request from the DCC device 210. If, however, the DCC device 210 cannot substantiate that it has paid for obtainable versions of the vehicle application and/or content, the server 240 (or a proxy thereof) is operable to obtain payment from the DCC device 210 by employing a fee arrangement, such as the fee arrangements noted above.

After ensuring that the DCC device 210 has paid for the obtainable versions of the vehicle application and/or content, the server 240 may then send such versions of the vehicle application and/or content to the DCC device 210 via the point-to-point protocol conduit, as shown in block 418. The DCC device 210, after obtaining from the server 240 the obtainable versions of the vehicle application and/or content, may carry out the servicing event using at least a portion of the particular vehicle information contained therein, as shown in block 420.

For example, the DCC device 210 may, as appropriate, update or otherwise incorporate into (e.g., by replacement and/or modification of) its current version of the vehicle application and/or content the vehicle application and/or content obtained from the server 240. After the updating, the DCC device 210 may communicatively re-couple, if decoupled, to the port on the internal-communication links 236(*a*)-236(*c*) and the vehicle-communication link 238. Thereafter, the DCC device 210 may interrogate the OBD device 232 and vehicle systems 234(*a*)-234(*b*) to obtain the select vehicle data. The DCC device 210 may then analyze one or more conditions of the vehicle 130 as a function of the select vehicle data and at least a portion of the particular vehicle information obtained from the server 240. In turn, the DCC device 210 may send a result of the analysis to the user interface 232 for display. At block 422, the flow 400 ends.

Figure 5:
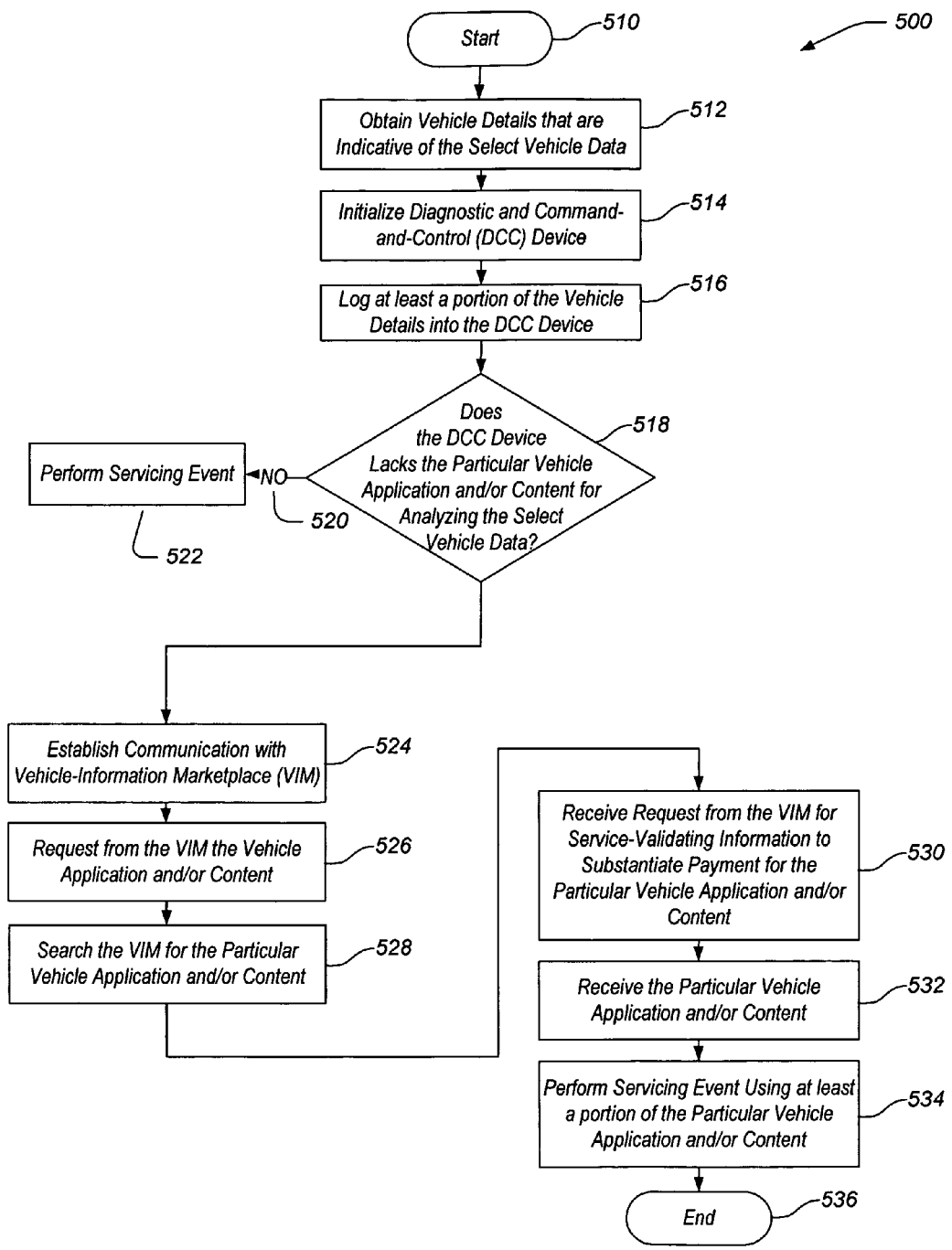
FIG. 5 is a third flow diagram illustrating a third flow for carrying out a servicing event of a vehicle in accordance with an embodiment.

FIG. 5 is a flow diagram illustrating a flow 500 for carrying out a servicing event of a vehicle in accordance with an embodiment. Although the flow 500 may be carried out by different architectures, for simplicity, the following is described with reference to the system 200.

In this embodiment, the DCC device 210 may be embodied as any of the handheld device embodiments noted above. The VIM 114 is configured as the single contact point for obtaining the vehicle information. The vehicle-communication link 238 may be embodied as a WLAN. And the communication network 112 may be embodied as a WLAN integrated with a public network, such as the Internet. The user is a service technician.

The flow 500 starts at block 510. As shown in block 512, a service manager or service technician obtains vehicle details that are indicative of the select vehicle data. To facilitate obtaining the vehicle details, a service manager or service technician obtains work order information for the vehicle 130, and then prepares in hard copy form or enters and stores into an electronic vehicle tracking system a work order containing the work order information. The work order information, as known in the art, generally includes the vehicle details about the vehicle 130 along with a brief description of the servicing event. This servicing event may include, for example, carrying out an analysis a problem, condition and/or operation of the vehicle 130 and/or carrying out routine services, such as preventive maintenance.

By correlating the vehicle details with the servicing event, the DCC device 210 and/or the service technician can determine that the vehicle details are indicative of the select vehicle data. For instance, the vehicle details may indicate that the vehicle 130 is a given make, model and year. The description of the servicing event may indicate that DCC device 210 uses a particular vehicle application and/or content to carry out the servicing event.

The DCC device 210 may use the particular vehicle application and/or content because the particular vehicle application employs logic to analyze the problem, condition, and/or operation or carry out the routine services in accordance with the particular content and the vehicle data that is correlated to the vehicle details, which may include the select vehicle data. Thus, by evaluating whether the particular vehicle application and/or content can carry out the servicing event in accordance with the vehicle details and the vehicle data that is correlated to the vehicle details, the service technician and/or the DCC device 210 may ascertain whether the DCC device 210 is deployed with or, conversely, lacks the particular vehicle information associated with analyzing the select vehicle data.

The work order also typically includes a number of sections for listing one or more suggested resolutions for the present servicing event and/or one or more previous resolutions for previous servicing events. Like the vehicle details, correlating the suggested and/or previous resolutions with the servicing event, the DCC device 210 and/or the service technician can determine that these resolutions are indicative of the select vehicle data.

For instance, the suggested and/or previous resolutions may be indicative of vehicle data that may be retrieved or otherwise obtained from the vehicle 130. The description of the servicing event may indicate that DCC device 210 uses a particular vehicle application and/or content to carry out the servicing event.

The DCC device 210 may use the particular vehicle application and/or content because the particular vehicle application employs logic to analyze the problem, condition, and/or operation or carry out the routine services in accordance with the particular content and the vehicle data that is correlated to the suggested and/or previous resolutions. Thus, by evaluating whether the particular vehicle application and/or content can carry out the servicing event in accordance with the suggested and/or previous resolutions that are indicative of the vehicle data, the service technician and/or the DCC device 210 may ascertain whether the DCC device 210 is deployed with or, conversely, lacks the particular vehicle information associated with analyzing the select vehicle data. For convenience, the rest of the flow 500 is described with respect to only the vehicle details and not the suggested and/or previous resolutions, with the understanding that the flow 500 may be equally carried out using the suggested and/or previous resolutions.

Referring again to flow 500 at block 514, the service technician initializes, e.g., boots, the DCC device 210, which may be accomplished by applying power to the DCC device 210. This typically happens after the vehicle 130 enters a service bay and/or after the service technician desires to work on the vehicle 130 using the DCC device 210. Responsive to the initiation of the boot, the DCC device 210 prepares for operation by performing any initialization sequences and loading the operating system, the current vehicle application and/or content.

After the DCC device 210 becomes operational, the service technician logs the vehicle 130 into the DCC device 210, as shown in block 316. To do this, the service technician may enter into the DCC device 210 via the user interface all or part of the vehicle details. For example, the service technician may enter into the DCC device 210 the vehicle identification number, which usually contains an indication of or is correlated to the make, model and year of the vehicle 130.

Alternatively, the DCC device 210 may automatically detect the vehicle details. Such automatic detection may be carried out by the service technician scanning a barcode or other vehicle identification tag using the scanning device coupled to or integrated into the DCC device 210. The DCC device 210 may also automatically detect the vehicle 130 by uploading the vehicle details from the work order via the user interface and/or the electronic vehicle tracking system.

As another alternative, the DCC device 210 may obtain the vehicle details, such as the vehicle identification number, without logging the vehicle 130 into the DCC device 210. For example, the DCC device 210 may obtain the vehicle details as a result of coupling the vehicle adapter to the vehicle 130. Such acquisition may occur because the vehicle adapter may be correlated to the vehicle details, as noted above. Alternatively, the DCC device 210 may automatically obtain the vehicle details from vehicle data retrieved from the vehicle 130 via the vehicle-communication link 238 after effectuating such a communication with the vehicle 130.

In addition to entering the vehicle details, the service technician may also have to confirm his or her authorization to use the DCC device 210 by supplying authentication and security credentials (e.g., user name and password) to gain access to and log the vehicle 130 into the DCC device 210. The service technician may also supply the service-validating information, which can be used at a later time to substantiate that the DCC device 210 has paid for or is operable to pay for the particular vehicle information that it lacks. Alternatively the service-validating information may be obtained automatically from, for example, a profile stored in the data store of the DCC device.

After obtaining the vehicle details, the DCC device 210 performs a check at decision block 518 to ascertain if it possesses, in accordance with the vehicle details, the particular vehicle information. To do this, the DCC device 210 may examine itself so as to determine if it has the particular vehicle information. In one embodiment, the DCC device 210 may scan its data store and memory to determine (i) if the current vehicle application (or, alternatively, a stored vehicle application) includes the directives and other commands for analyzing the select vehicle data, and (ii) if the current content (or, alternatively, stored content) includes the parametric and/or characteristic data for analyzing the select vehicle data. The DCC device 210 may use the versions of the vehicle application and/or content to make the determination. In another embodiment, the service technician may examine the data store and memory of the DCC device 210 via the user interface 232 to determine if the DCC device 210 possesses the particular vehicle application and/or content.

If the DCC device 210 ascertains or the service technician confirms that the DCC device 210 possesses the particular vehicle information, then the DCC device 210 may perform the vehicle diagnostics or the services in accordance with such information, as shown by path 520 to block 522. However, if the DCC device 210 or the service technician ascertains that the DCC device 210 lacks the particular vehicle information, then the DCC device 210 steps to block 524. In addition, if the service technician ascertains that the DCC device 210 lacks the particular vehicle information, then before stepping to block 524, the service technician may set an indication on the DCC device 210 that indicates that the DCC device 210 lacks the particular vehicle information.

At block 524, the DCC device 210 establishes a communication with the VIM 114. To do this, the DCC device 210 via one or more of its communications interface adapters may establish a point-to-point conduit with the VIM 114. The point-to-point conduit may be effectuated by the DCC device 210 first registering with the communication network 112, as noted above, and then coupling to the server 240 of the VIM 114 via the communication network 112 using generally known techniques.

After the point-to-point conduit is established, the DCC device 210 may send to the server 240 a first request for the particular vehicle application and/or content, as shown in block 526. This first request may be formatted in accordance with most any communication signaling and/or messaging protocol, including the protocols noted above.

Responsive to the first request, the server 240 may query itself and/or one or more of the vehicle-information servers 216-228 to obtain-the particular vehicle application and/or content, as shown in block 528. Prior to sending the particular vehicle application and/or content to the DCC device 210, however, the DCC device 210 may receive from the server 240 a second request for the service-validating information to substantiate that the DCC device 210 has paid for the particular vehicle application and/or content, as shown in block 530. Like above, this second request may be formatted in accordance with most any communication signaling and/or messaging protocol. For simplicity, however, this second request may be in the same format as the first request from the DCC device 210.

If, however, the DCC device 210 cannot substantiate that it has paid for the vehicle information, the server 240 (or a proxy thereof) is operable to obtain payment from the DCC device 210 by employing a fee arrangement, such as the fee arrangements noted above. After ensuring that the DCC device 210 has paid for the particular vehicle application and/or content, the server 240 may then send such information to the DCC device 210 via the point-to-point protocol conduit, as shown in block 532. The DCC device 210, after obtaining the particular vehicle application and/or content from the server 240, may carry out the servicing event using at least a portion of the particular vehicle application and/or content obtained from server 240, as shown in block 534.

To facilitate this, the DCC device 210 may, as appropriate, update or otherwise incorporate into (e.g., by replacement and/or modification of) its current particular vehicle application and/or content any of the particular vehicle application and/or content obtained from the server 240. After such update, the DCC device 210 may communicatively couple to the OBD device 232 and one or more of the vehicle systems 234(a)-234(b) via the internal-communication links 236(a)-236(c) and the vehicle-communication link 238, using appropriate protocols for the WLAN.

To effectuate such coupling, the DCC device 210, OBD device 232 and vehicle systems 234(a)-234(b) may first register with the vehicle-communication link 238 in manner similar to registering with the communication network 112 taking into account the appropriate protocols for the WLAN. After registering, the DCC device 210 may then communicatively couple to the OBD device 232 and one or more of the vehicle systems 234(a)-234(b) via internal-communication links 236(a)-236(c).

Thereafter, the DCC device 210 may interrogate the OBD device 232 and vehicle systems 234(a)-234(b) to obtain the vehicle data. The DCC device 210 may then analyze one or more conditions of the vehicle 130 as a function of the select vehicle data and at least a portion of the particular vehicle application and/or content obtained from the server 240. In turn, the DCC device 210 may send a result of the analysis to the user interface 232 for display. At block 536, the flow 500 ends.

Figure 6:
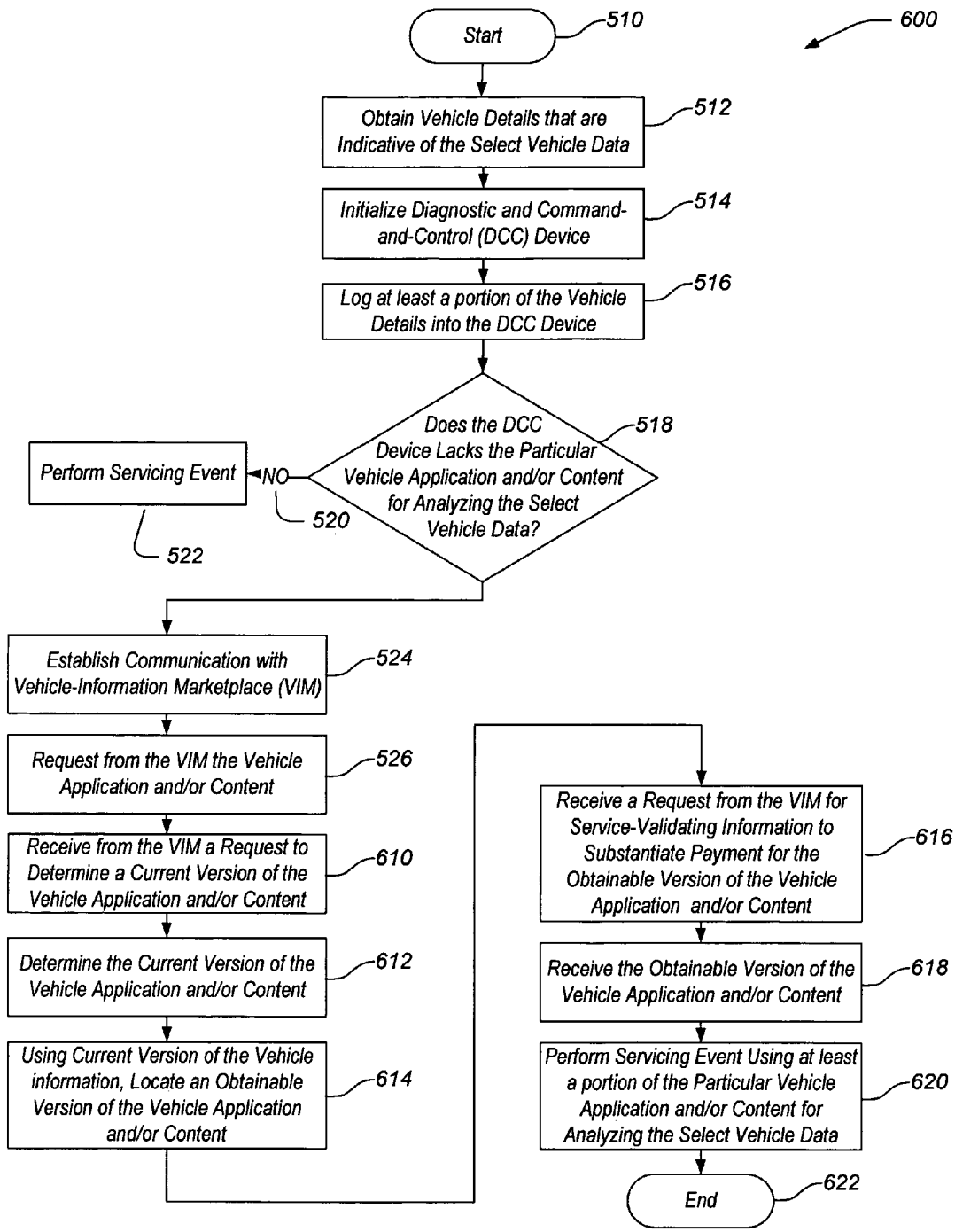
FIG. 6 is a fourth flow diagram illustrating a fourth flow for carrying out a servicing event of a vehicle in accordance with an embodiment.

Referring now to FIG. 6, a flow diagram illustrating a flow 600 for carrying out a servicing event of a vehicle in accordance with an embodiment is provided. Although the flow 600 may be carried out by different architectures, for simplicity, the following is described with reference to the system 200. The flow 600 includes the blocks 510-526 of flow 500. The flow 600 also includes blocks 610-622, which are substantially similar to the blocks 410-422; the description of which need not be repeated here with the following exceptions. With reference blocks 610-622, the current version of vehicle application and/or content is a version of the vehicle application and/or content possessed by the DCC device 210. In addition, the obtainable version of the vehicle application and/or content includes the particular vehicle application and/or content for analyzing the select vehicle data.

An Exemplary Architecture of a Diagnostic and Command-and Control Device

Figure 7:
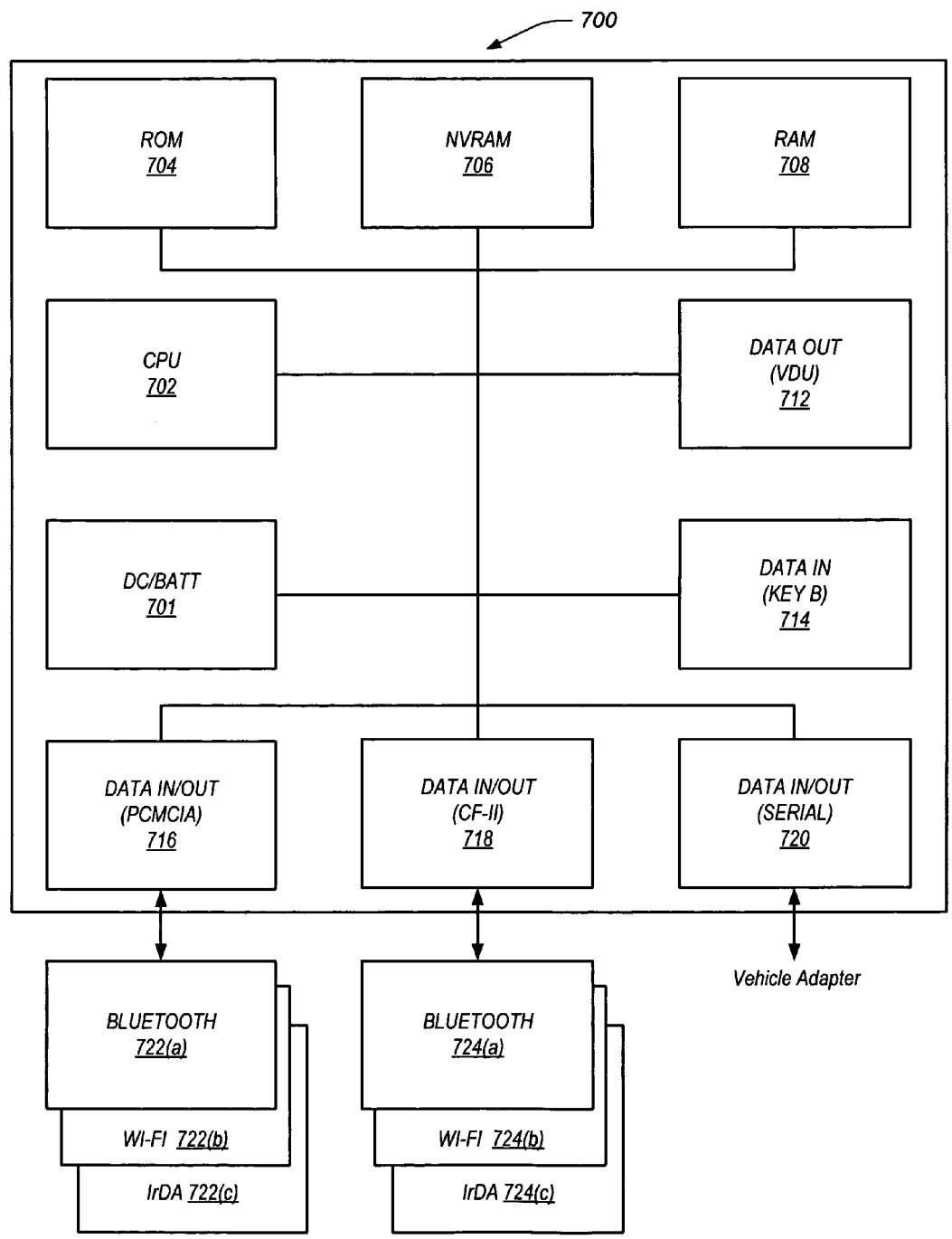
FIG. 7 is third block diagram illustrating an example of a general architecture of scan-type diagnostic tool for interfacing with a vehicle in accordance with an embodiment.

FIG. 7 is block diagram illustrating an example of a general architecture of scan-type diagnostic tool ("scan tool") 700 for interfacing with a vehicle, such as the vehicle 130, in accordance with an embodiment. The scan tool 700 may include a battery 701 for supplying the scan tool 700 with power, and a processor 702 that is communicatively coupled via an internal bus 710 to (i) memories 704-708; (ii) user-interface input and/or output (I/O) modules 712, 714 for an integrated user interface (not shown); and (iii) input and output (I/O) communication ports 716-720. Each of the I/O communication ports 716-720, in turn, may be respectively coupled to communications interface adapters 722(a)-722(c), communications interface adapters 724(a)-724(c), and a vehicle adapter for coupling to the OBD device 232 and one or more vehicle systems 234(a)-234(b) of vehicle 130.

The battery 701 may be a rechargeable and replaceable battery that may temporarily-connected, or alternatively, affixed to the scan tool 701. The battery 701 may provide power to each of the above-listed components connected to the internal bus 710, if necessary. The battery may also supply power to the communications interface adapters 722(*a*)-722 (*c*), and 724(*a*)-724(*c*).

The processor 702 may be any processor capable of running the vehicle application as noted above. One such processor may be a processor designed for mobility, such as an Intel Mobile Centrino™ Processor. The processor 702 provides task coordination and processing functionality for carrying out at least one vehicle application, which includes logic (such as software and/or firmware code) that employs directives or other commands to process the select vehicle data. This logic along with other logic for operating the scan tool 702 may be stored in the read-only memory ("ROM") 704, non-volatile random access memory ("NVRAM") 706, random access memory ("RAM") 706 or a combination thereof.

For example, an operating system and device drivers for (i) the user-interface I/O modules 712, 714, (ii) the I/O communication ports 716-720, and (iii) the vehicle adapter may be stored in the ROM 704. The vehicle application, vehicle data, and device drivers for the communications interface adapters 722(*a*)-722(*c*), 724(*a*)-724(*c*) may be stored in the NVRAM 706. The RAM 708 facilitates storage for runtime processing. Accordingly, the RAM may obtain after initialization some or all of the items stored in ROM 704 and NVRAM 706 along with (i) the select vehicle data obtained via the I/O communication ports 716-720, (ii) user input obtained by the user-interface I/O modules 712, 714 via the user interface, and/or (iii) the particular vehicle information obtained from the VIM 130 via one or more of the communications interface adapters 722(*a*)-722(*c*), 724(*a*)-724(*c*).

The user-interface I/O modules 712, 714 may be adapted to provide a display and graphical-user-interface (GUI) environment. Such components may be operable to enhance the vehicle application by providing (i) simultaneous display of vehicle data and other information; (ii) user-friendly access to features of the DCC device 210; (iii) streamlined data entry; and/or (iv) a graphical display of parameters (e.g., history, meters, bar graphs, etc.).

For example, the user-interface I/O modules 712, 714 embodied as a video display unit (VDU) driver module and an input driver module, respectively. The input driver module may be adapted to exchange input data from an input device, such as a keyboard, keypad, a pointing device, a stylus, etc., to provide the user-friendly access to features of the DCC device 210 and to provide streamlined data entry. The VDU driver module may be adapted to drive a video display for providing the simultaneous display of vehicle data and other information and/or graphical display of the vehicle data and other information.

Each of the I/O communication ports 716, 718 may be configured to communicate according to a standard or proprietary communication protocol so as to provide an interface for coupling the respective communications interface adapters 722(*a*)-722(*c*), 724(*a*)-724(*c*) to the scan tool 700. For instance, the I/O communication port 716 may be adapted to communicate with the communications interface adapters 722(*a*)-722(*c*) according to a CompactFlash™ Type-1 or 2 protocol. The I/O communication port 718 may be adapted to communicate with the communications interface adapters 724(*a*)-724(*c*) according to a PCMCIA Type-1 or 2 protocol.

Accordingly, the communications interface adapters 722(*a*)-722(*c*), 724(*a*)-724(*c*) may be adapted to communicate with the I/O communication ports 716, 718, respectively. Continuing with the above example, the communications interface adapters 722(*a*)-722(*c*) may be in the form of a CompactFlash™ Type 1 or 2 protocol adapter (commonly referred as a CompactFlash™ card). The communications interface adapters 724(*a*)-724(*c*) may be in the form of a personal computer memory card international association ("PCMCIA") Type-1 or 2 protocol adapter (commonly referred as a PCMCIA card).

The communications interface adapters 722(*a*)-722(*c*), 724(*a*)-724(*c*) may also be adapted to capable of carrying out communications with the VIM 114 in accordance with most any communication protocol, including the communication protocols noted above. For example, each of the communications interface adapters 722(*a*) and 724(*a*); 722(*b*) and 724 (*b*), 722(*c*) and 724(*c*) may be any of a Bluetooth™, IEEE 802.11 et seq., IEEE 802.15, Zigbee, IEEE 802.16, or other WLAN, WPAN, UWB, and BWA network compliant controller. As shown in FIG. 7, the communications interface adapters 722(*a*) and 724(*a*); 722(*b*) and 724(*b*), 722(*c*) and 724(*c*) are Bluetooth™-Compliant controllers, IEEE 802.11 et. seq. compliant controllers, and IrDA-compliant controllers, respectively.

When inserted in the respective I/O communication ports 716, 718, the communications interface adapters 722(*a*) and/or 724(*a*) is operable to equip the scan tool 700 with Bluetooth™ connectivity. Similarly, the communications interface adapters 722(*b*) and/or 724(*b*) is operable to equip the scan tool 700 with IEEE 802.11 et. seq. connectivity when inserted in the respective I/O communication ports 716, 718. The communications interface adapters 722(*c*) and/or 724(*c*) are operable to equip the scan tool 700 with IrDA connectivity.

As an alternative to removable wireless networking controllers, the scan tool 700 may employ a communications interface adapter (not shown) embodied as a hard-wired, non-removable wireless network controller. The deployment of the scan tool 700 with such wireless network controller may (i) reduce the cost of manufacture of the scan tool 700, (ii) improve the structural integrity of the scan tool 700, and (iii) improve the internal power consumption of the scan tool 700 as compared to the scan tool 700 not possessing such wireless network controller.

The above-described architecture of the scan tool 700 is for exemplary purposes only. Other embodiments and/or more or less components of the scan tool 700 may be used as well.

An Exemplary Compilation of Display Screens

Figure 8:
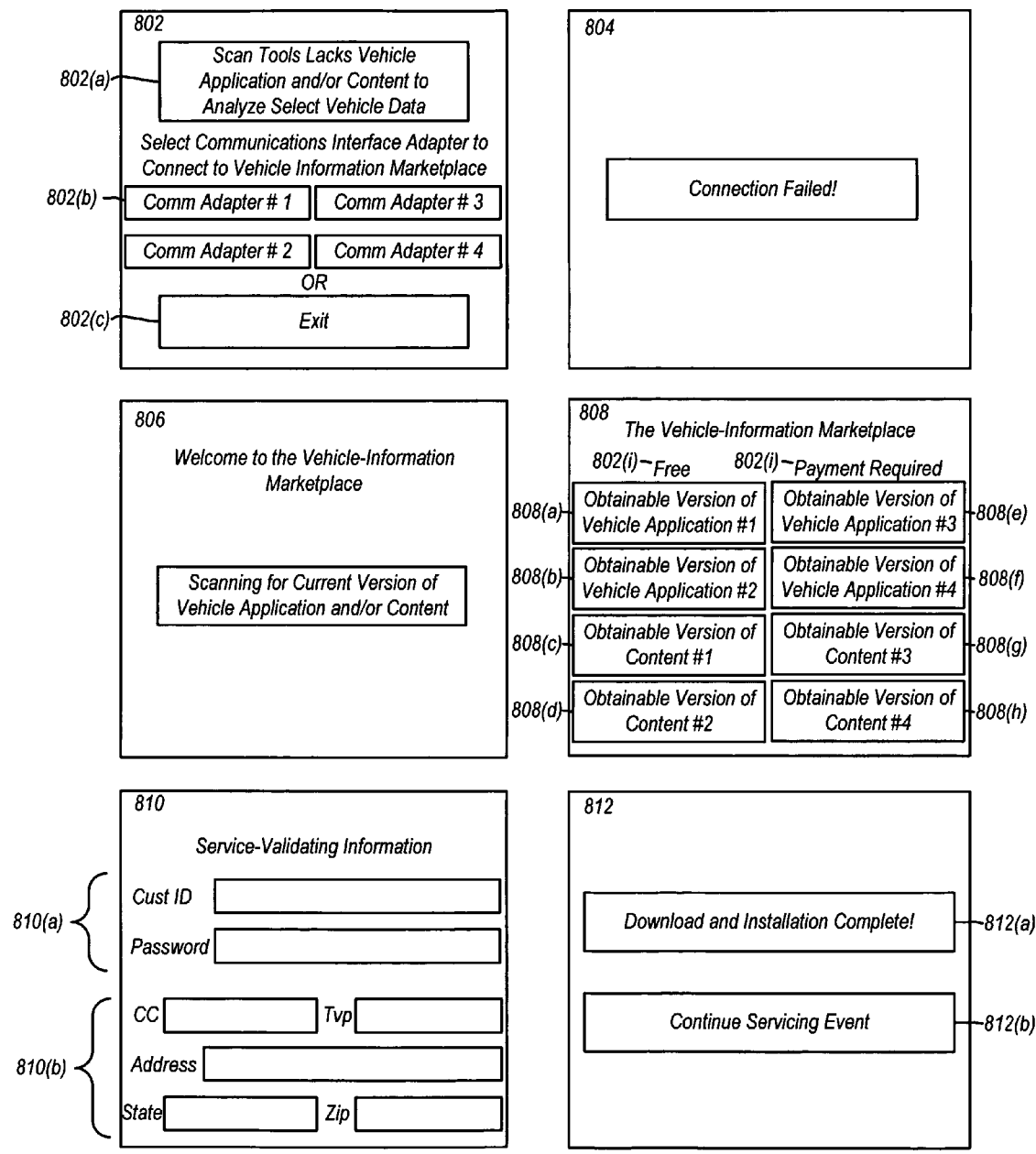
FIG. 8 is an example of a compilation of screen shots of a display of a Diagnostic and Command-and-Control device carrying out a servicing event of a vehicle in accordance with an embodiment.

FIG. 8 is an example of a compilation of screen shots 802-812 of a display 810 of a DCC device carrying out a servicing event of a vehicle in accordance with an embodiment. Although the compilation of screen shots 800 may be provided by different architectures and operations, the following is described with reference to the system 200 and flow 600 for simplicity.

In this embodiment, the DCC device 210 may be embodied as any of the scan tool 700. The VIM 114 may be configured as the single contact point for obtaining the vehicle information. The server 240 may be embodied as web server. The vehicle-communication link 238 may be embodied as a WLAN. And the communication network 112 may be embodied as a WLAN integrated with a public network, such as the Internet. The user is a service technician.

After the scan tool 700 or the service technician ascertains that the scan tool 700 lacks the particular vehicle application and/or content, then the processor 702 causes the user-interface output module 714 to output to the display of the scan tool 700 the screen shot 802. The screen shot 802 includes (i) a first GUI part 802(*a*) that indicates that the scan tool 700 lacks the particular vehicle application and/or content; (ii) a second GUI part 802(*b*) that indicates that one or more of the communications interface adapters 722(a)-722(c), 724(a)-724(c) are available for effectuating a communication with the VIM 114; and (ii) a third GUI part 802(c) that indicates that the scan tool 700 may exit the servicing event.

After a selection of the communications interface adapter 722(a), for example, the scan tool 700, using the selected adapter, attempts to establish a connection with the VIM 114 via an access point to the communication network 112 in accordance with the protocol of the WLAN. If, however, the communications interface adapter 722(a) is unable to connect with the access point or other portion of the communication network 112, the processor 702 causes the user-interface output module 714 to output to the display of the scan tool 700 the screen shot 804. The screen shot 804 includes a GUI part 804(a) that indicates that the communications interface adapter 722(a) failed to connect with the access point or other portion of the communication network 112.

After a given amount of time or after user interaction, the scan tool 700 redisplays screen 802 to allow selection or reselection of one of the communications interface adapters 722(a)-722(c), 724(a)-724(c). Until one of the communications interface adapters 722(a)-722(c), 724(a)-724(c) connects with the access point and other portions of the communication network 112 or until the scan tool 700 exits from the servicing event 802, the scan tool 700 may display and redisplay screens 802 and 804.

After establishing a connection, the scan tool 700 may establish, using generally known techniques, the point-to-point conduit with the server 240 of the VIM 114. And after the point-to-point conduit is established, the scan tool 700 may then send to the server 240 a first request for the particular vehicle application and/or content.

Responsive to the first request, the scan tool 700 receives from the server 240 a second request to interrogate the scan tool 700 to determine the current version of vehicle application and/or content possessed by the scan tool 700. The second request may be formatted in accordance with most any communication signaling and/or messaging protocol. For simplicity, however, this second request may be in the same format as the first request from the scan tool 700.

In response to an automatic or user selected affirmative reply to the second request, the server 240 interrogates the scan tool 700 to determine the current version of the vehicle application and/or content. To facilitate this interrogation, the server 240 may (i) download to the scan tool 700 (usually after approval from the scan tool 700) a query application to scan the ROM 704, NVRAM 706, and/or RAM 708 to obtain the current versions (and possibly, version numbers) of the vehicle application and/or content, and (ii) cause the processor 702 to execute the downloaded query application.

While the query application interrogates the scan tool 700, the processor 702 causes the user-interface output module 714 to output to the display of the scan tool 700 the screen shot 806. After scanning the ROM 704, NVRAM 706, and/or RAM 708, the processor 702 via the query application may send to the server 240 the current versions (and/or version numbers) of the vehicle application and/or content.

The server 240, using the current versions (and/or version numbers) of the vehicle application and/or content obtained via the query application, may query itself and/or one or more of the vehicle-information servers 216-228 to locate obtainable versions of the vehicle application and/or content that include the particular vehicle information. After locating the obtainable versions of the vehicle application and/or content, the server 240 may acquire for distribution to the scan tool 700 the obtainable versions of the vehicle application and/or content.

In turn, the server 240 sends to the scan tool 700 via the query application the obtainable versions of the vehicle application and/or content. The query application then completes, unloads from the NVRAM 706 and/or RAM 708, and is typically deleted from the scan tool 700. The query program, however, may be stored in the NVRAM 706 for later retrieval and use.

The processor 702 then causes the user-interface output module 714 to output to the display of the scan tool 700 the screen shot 808. This screen shot 808 may includes an almost limitless number of GUI parts to indicate the obtainable versions of the vehicle application and/or content that are available for download. As illustrated, however, the screen shot 808 includes eight GUI parts, namely GUI parts 808(a)-808(h), for simplicity.

The screen shot 808 also includes GUI notations, namely GUI notations 808(i), 808(j), which are used to indicate a charge for downloading the obtainable versions of the vehicle application and/or content. As illustrated, GUI notation 808(i) indicates that the obtainable versions of the vehicle application and/or content listed in the GUI parts 808(a)-808(d) are free of charge. On the other hand, GUI notation 808(j) indicates that the obtainable versions of the vehicle application and/or content listed in the GUI parts 808(e)-808(h) have an associated fee for download.

After selection of any of the obtainable versions of the vehicle application and/or content listed in the GUI parts 808(e)-808(h), the server 240 may send a third request for the service-validating information to substantiate that the scan tool 700 has paid for the obtainable versions of the vehicle application and/or content selected via the user interface. Like above, the third request may be formatted in accordance with most any communication signaling and/or messaging protocol. For simplicity, however, this third request may be in the same format as the first request.

To facilitate obtaining the service-validating information from the scan tool 700, the processor 702 may cause the user-interface output module 714 to output to the display of the scan tool 700 the screen shot 810. The screen shot includes a various number of GUI parts 810(b) for obtaining service-validating information, such user name and password for a subscription arrangement. Via the user interface and the user-interface input module 716, the processor 702 may receive the service-validating information.

If, however, the scan tool 700 cannot substantiate that it has paid for obtainable versions of the vehicle application and/or content selected, the server 240 (or a proxy thereof) is operable to obtain payment from the scan tool 700 by employing a fee arrangement, such as the fee arrangements noted above. To facilitate payment, the processor 702 may cause the user-interface output module 714 to output to the display of the scan tool 700 the screen shot 810, which includes a various number of GUI parts 810(b) for obtaining service-validating information, such a credit information.

After ensuring that the scan tool 700 has paid for the selected obtainable versions of the vehicle application and/or content or after selecting obtainable versions of the vehicle application and/or content that are free of charge, the server 240 may then download or otherwise send such versions of the vehicle application and/or content to the scan tool 700 via the point-to-point protocol conduit. After completion of this download, the scan tool 700 may, as appropriate, install, update or otherwise incorporate into (e.g., by replacement and/or modification of) its current version of the vehicle application and/or content the vehicle application and/or content obtained from the server 240.

After completion of the download and installation, the processor 702 causes the user-interface output module 714 to output to the display of the scan tool 700 the screen shot 812. The screen shot 812 includes a first GUI part 812(*a*) that indicates that the vehicle application and/or content obtained from the server 240 is installed and ready to use. The screen shot 812 also includes a second GUI part 812(*b*) that indicates that the scan tool is available for carrying out the servicing event.

After receiving an input to continue the servicing event via the user-interface input module 716, the processor 702 may direct the I/O communication port 720, via the vehicle adapter, to communicatively re-couple, if decoupled, to the internal-communication links 236(*a*)-236(*c*) and the vehicle-communication link 238. Thereafter, the scan tool 700 may interrogate the OBD device 232 and vehicle systems 234(*a*)-234(*b*) to obtain the vehicle data. The scan tool 700 may then analyze one or more conditions of the vehicle 130 as a function of the vehicle data and at least a portion of the particular vehicle information obtained from the server 240. In turn, the scan tool 700 may send a result of the analysis to the user interface for display on the GUI.

CONCLUSION

Variations of the system and method described above are possible without departing from the scope of the following claims. For example, the aforementioned logic may be run locally on proprietary equipment owned or leased by various users, e.g., fleet managers, vehicle distributors, vehicle dealers and the like. The logic may be embodied as a stand alone or alternatively a distributed software application. Also, the logic may include software and/or firmware code or instructions for carrying out freely available and/or proprietary web browsers and the like for communicating with the vehicle information marketplace.

Further, the VDS may be incorporated in whole or in part in the OBD units and/or vehicle systems, thereby obviating the need for a separate VDS. Accordingly, the OBD units and/or vehicle systems can be equipped with, for example, a bar code scanner and/or other human user interface to facilitate data capture. Note also that one or more additional servers can also be incorporated into the system to, for example, accommodate additional data management functions and/or provide interfaces for integrating with the vehicle application and/or logic of the VDS.

The vehicle information obtained via the vehicle application can be used to, for example, re-calibrate vehicle components, perform firmware downloads, perform component failure analysis, determine wear characteristics, analyze quality of components used in their manufacturing processes, retrieve and manage warranty information, receive indications of vehicle maintenance needs, monitor vehicle use and abuse, and/or monitor lessee trip information, perform proactive data analysis, perform pre-arrival diagnostics, recalibrate vehicle components, and/or perform firmware downloads. Note that this list of options is not exhaustive and those of skill in the art will understand that other variations in the data obtained via the system, and how the data is presented and used can vary without departing from the scope of the following claims.

Moreover, the exchanges between (i) the VDS and the VIM, (ii) the VDS and the vehicle, and (iii) the vehicle and VIM may be carried out using synchronous or asynchronous techniques and may be carried out in real time, near-real time or in any other time frame. In real time each of the exchanges receives an immediate response such that the information is received so as not to delay processing. In near-real time each of the exchanges receives a response such that the information is received so as to not substantially delay processing or significant degrade a performance of the processing systems.

As described above, the communications between the VDS and the VIM and the VDS may be carried out in accordance with any 1G, 2G, 2.5G and 3G telecommunication protocol, which may include any the commonly used protocols, such as Advanced Mobile Phone Service (AMPS), Time Division Multiple Access (TDMA), Global System for Mobile Communications (GSM), and Code Division Multiple Access (CDMA), Universal Mobile Telecommunications Service ("UMTS"), Wide-band CDMA ("WCDMA"), ultra wide-band CMDA, CDMA2000, Generic Packet Radio Services ("GPRS"), Telecommunications Industry Association's (TIA) IS-94 specifications, and any combination or variation thereof.

Further, the vehicle systems and other vehicle mounted devices may include or be utilized with any appropriate voltage source, such as a battery, an alternator and the like. The voltage source may provide any appropriate voltage, such as about 12 Volts, about 24 Volts, about 42 Volts and the like.

Also, the embodiments described herein may be used with any desired system or engine. These systems or engines may utilize (i) fossil fuels, such as gasoline, natural gas, propane and the like; (ii) electricity, such as that generated by battery, magneto, solar cell and the like; (iii) wind and hybrids; and/or (iv) combinations thereof. Those systems or engines may be incorporated into other systems, such as an automobile, a truck, a boat or ship, a motorcycle, a generator, an airplane and the like.

In addition, the computing platforms, systems, controllers, and other devices containing processors described herein may contain at least one Central Processing Unit ("CPU") and a memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding-to or representative of the data bits. It should be understood that the exemplary embodiments are not limited to the above-mentioned platforms or CPUs and that other platforms and CPUs may support the described methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It should be understood that the exemplary embodiments are not limited to the above-mentioned memories and that other platforms and memories may support the described methods.

Further, the claims should not be read as limited to the described order or elements unless stated to that effect. In addition, use of the term "means" in any claim is intended to invoke 35 U.S.C. §112 ¶.6, and any claim without the word "means" is not so intended.

What is claimed is:

1. An apparatus for analyzing a condition of a vehicle, the apparatus comprising a computing platform having logic to:
   obtain, via an interface that is communicatively coupled to the vehicle, select-vehicle data associated with an operation of the vehicle,
   ascertain that the computing platform lacks particular information for analyzing the select-vehicle data;
   communicatively couple to a remote node via a network to obtain the particular information for analyzing the select-vehicle data;
   obtain from the remote node via the network the particular information for analyzing the select-vehicle data; and
   analyze the condition of the vehicle using at least a portion of the particular information for analyzing the select-vehicle data.

2. The apparatus of claim 1, wherein the computing platform includes a data store that contains previously-stored information for analyzing vehicle data, wherein the logic to ascertain that the computing platform lacks the particular information comprises logic to query the data store for the particular information, and receive, in response to the query, an indication the data store lacks the particular information.

3. The apparatus of claim 1, wherein the computing platform includes a data store that contains a previously-stored set of information for analyzing vehicle data for each of a plurality of vehicles, wherein the data store includes an identifier associated with each set of information, and wherein the logic to ascertain that the computing platform lacks the particular information comprises logic to obtain a given identifier corresponding to the particular information, query the data store for the given identifier, and receive, in response to the query, an indication the data store lacks the given identifier.

4. The apparatus of claim 3, wherein the logic to obtain the given identifier comprises logic to obtain the given identifier from the select-vehicle data.

5. The apparatus of claim 3, wherein the logic to obtain the given identifier comprises logic to obtain the given identifier via an input interface.

6. The apparatus of claim 5, wherein the input interface comprises an interface selected from a group of interfaces consisting of a user interface, a machine interface, and a combination of a man and machine interface.

7. The apparatus of claim 5, wherein the logic is adapted to obtain the given identifier prior to obtaining the vehicle data.

8. The apparatus of claim 1, wherein the logic to communicatively couple to the remote node comprises logic to use wireless communication between at least the computing platform and an access node on the network.

9. The apparatus of claim 1, wherein the logic to obtain from the remote node via the network the particular information comprises logic to request from the remote node the particular information, and receive, in response to the request, the particular information.

10. The apparatus of claim 9, wherein the remote node charges a fee for the particular information, and wherein the logic to obtain from the remote node via the network the particular information further comprises logic to exchange with the remote node information for covering the charge for the particular information.

11. The apparatus of claim 10, wherein the information for covering the charge for the particular information comprises information for substantiating a subscription for the particular information.

12. The apparatus of claim 10, wherein the information for covering the charge for the particular information comprises information for paying for the particular information.

13. The apparatus of claim 12, wherein the information for paying for the particular information comprises fee-arrangement information selected from the group of fee-arrangement information consisting of credit information, prepaid-fee-arrangement information, debit information, checking account information, and savings account information.

14. The apparatus of claim 1, wherein:
   the computing platform further comprises a data store that contains previously-stored information for analyzing vehicle data,
   the previously-stored information lacks the particular information for analyzing the vehicle data,
   the logic to communicatively couple to a remote node comprises logic to establish a point-to-point communication conduit between the computing platform and remote node,
   the logic to obtain from the remote node via the network the particular information comprises logic to (a) allow the remote node to interrogate the data store for the particular information, and (b) receive the particular information from the remote node in response to the remote node determining that the data store lacks the particular information.

15. A system for analyzing a condition of a vehicle, the system comprising:
   a first device for providing select-vehicle data associated with an operation of the vehicle, wherein the first device is disposed aboard the vehicle;
   a second device for providing information for analyzing vehicle data for each of a plurality of vehicles, wherein the second device is communicatively coupled to a network;
   a third device comprising a computing platform having logic to:
      obtain the select-vehicle data from the first device via an interface that is communicatively coupled to the first device;
      ascertain that the computing platform lacks particular information for analyzing the select-vehicle data;
      communicatively couple to the second device via the network to obtain the particular information for analyzing the select-vehicle data;
      obtain from the second device via the network the particular information for analyzing the select-vehicle data; and
      analyze the condition of the vehicle using at least a portion of the particular information for analyzing the select-vehicle data.

16. The system of claim 15, wherein the computing platform includes a data store that contains previously-stored information for analyzing vehicle data, wherein the logic to ascertain that the computing platform lacks the particular information comprises logic to query the data store for the particular information, and receive, in response to the query, an indication the data store lacks the particular information.

17. The system of claim 15, wherein the computing platform includes a data store that contains a previously-stored set of information for analyzing vehicle data for each of a plurality of vehicles, wherein the data store includes an identifier associated with each set of information, and wherein the logic to ascertain that the computing platform lacks the particular information comprises logic to obtain a given identifier corresponding to the particular information, query the data store for the given identifier, and receive, in response to the query, an indication the data store lacks the given identifier.

18. The system of claim 15, wherein the logic to obtain from the second device via the network the particular information comprises logic to request from the second device the particular information, exchange with the second device information for covering a fee for the particular information charged by the second device, and receive, in response to the request, the particular information.

19. A method for analyzing a condition of a vehicle, the method comprising:
  obtaining select-vehicle data via an interface that is communicatively coupled to a first device that is disposed aboard the vehicle;
  ascertaining that particular information for analyzing the select-vehicle data is lacking;
  communicatively coupling to a server via a network to obtain the particular information for analyzing the select-vehicle data;
  obtaining from the server via the network the particular information for analyzing the select-vehicle data; and
  analyzing the condition of the vehicle using at least a portion of the particular information for analyzing the select-vehicle data.

20. The method of claim 19, wherein the step of obtaining from the server via the network the particular information comprises requesting the particular information from the server, exchanging with the server information for covering a fee for the particular information, and responsively receiving, the particular information from the server.

* * * * *